United States Patent
Ohno et al.

(10) Patent No.: US 9,531,922 B2
(45) Date of Patent: Dec. 27, 2016

(54) IMAGE PROCESSING APPARATUS, IMAGE PROCESSING METHOD, AND COMPUTER READABLE STORAGE MEDIUM FOR IMPROVING SHARPNESS

(71) Applicant: CANON KABUSHIKI KAISHA, Tokyo (JP)

(72) Inventors: Takenori Ohno, Tokyo (JP); Satoshi Ikeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 14/515,883

(22) Filed: Oct. 16, 2014

(65) Prior Publication Data

US 2015/0116549 A1 Apr. 30, 2015

(30) Foreign Application Priority Data

Oct. 30, 2013 (JP) ................................. 2013-226038
Dec. 20, 2013 (JP) ................................. 2013-264501

(51) Int. Cl.
*H04N 5/217* (2011.01)
*H04N 5/357* (2011.01)

(52) U.S. Cl.
CPC .............. *H04N 5/217* (2013.01); *H04N 5/357* (2013.01)

(58) Field of Classification Search
None
See application file for complete search history.

(56) References Cited

U.S. PATENT DOCUMENTS

| | | | |
|---|---|---|---|
| 8,994,882 B2* | 3/2015 | Seshadrinathan | H04N 5/911 348/180 |
| 2006/0082665 A1* | 4/2006 | Mizukura | H04N 9/045 348/272 |
| 2012/0133805 A1* | 5/2012 | Ohwa | H04N 5/217 348/246 |
| 2013/0242116 A1* | 9/2013 | Fujii | H04N 17/00 348/180 |

FOREIGN PATENT DOCUMENTS

| | | |
|---|---|---|
| JP | 3321915 B2 | 9/2002 |
| JP | 2006-221221 A | 8/2006 |
| JP | 2008-140012 A | 6/2008 |
| JP | 2010-258628 A | 11/2010 |

OTHER PUBLICATIONS

S. Daly, "The Visible Differences Predictor: An Algorithm for the Assessment of Image Fidelity", Measurement and Prediction in Visual Quality, in A.B. Watson, Editor, Digital Image and Human Vision, pp. 179-206, Cambridge, MA, MIT Press, 1993.

* cited by examiner

*Primary Examiner* — Albert Cutler
(74) *Attorney, Agent, or Firm* — Carter, DeLuca, Farrell & Schmidt, LLP

(57) ABSTRACT

An image processing apparatus acquires an evaluation value concerning noise for each region of an image frame corresponding to the image data, and controls image processing of each region of the image frame corresponding to image data in accordance with the evaluation value.

4 Claims, 21 Drawing Sheets

| APERTURE VALUE | ZOOM POSITION | CORRECTION COEFFICIENT |
|---|---|---|
| 2.4 | 1.0 | $\begin{bmatrix} 0 & -1 & 0 \\ -1 & 3 & -1 \\ 0 & -1 & 0 \end{bmatrix}$ |
| ⋮ | ⋮ | ⋮ |
| ⋮ | ⋮ | ⋮ |

| APERTURE VALUE | ZOOM POSITION | REGION COORDINATES | CORRECTION COEFFICIENT |
|---|---|---|---|
| 2.4 | 1.0 | (1.1) | $\begin{bmatrix} 0 & -1 & 0 \\ -1 & 3 & -1 \\ 0 & -1 & 0 \end{bmatrix}$ |
| ⋮ | ⋮ | ⋮ | ⋮ |
| ⋮ | ⋮ | ⋮ | ⋮ |

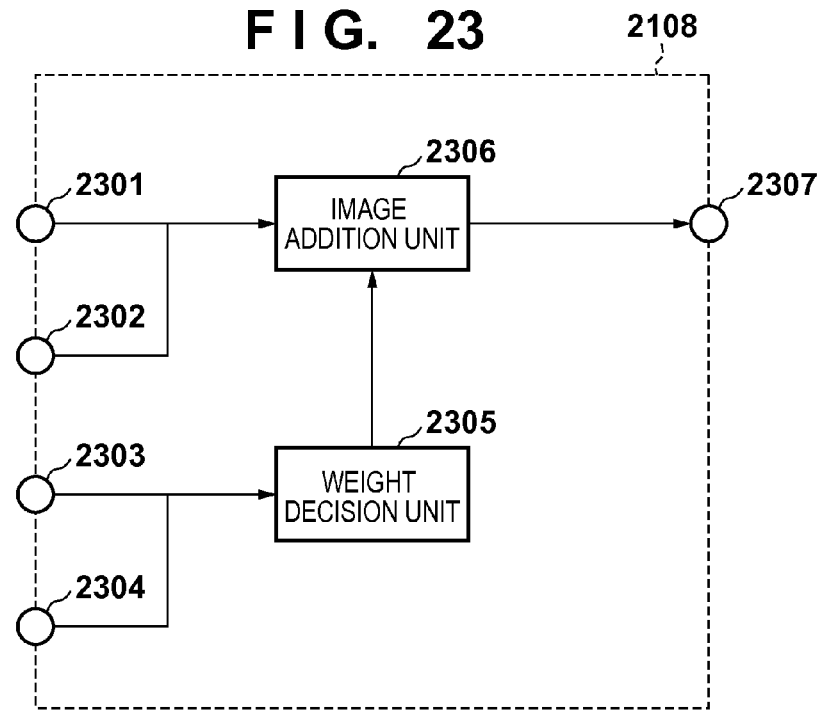
F I G. 23
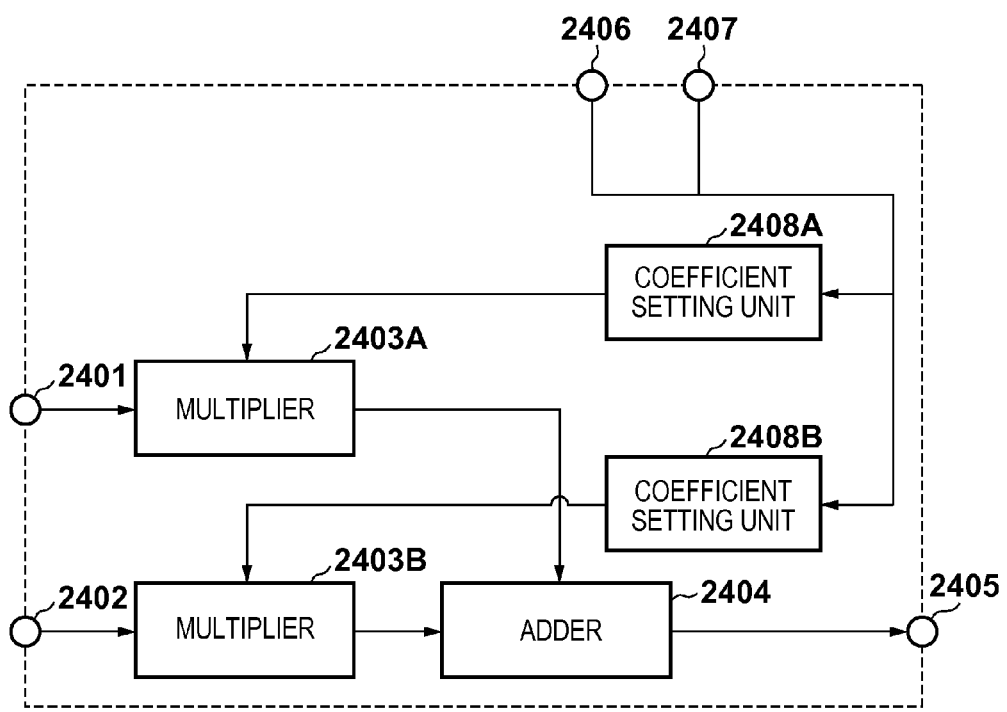
F I G. 24

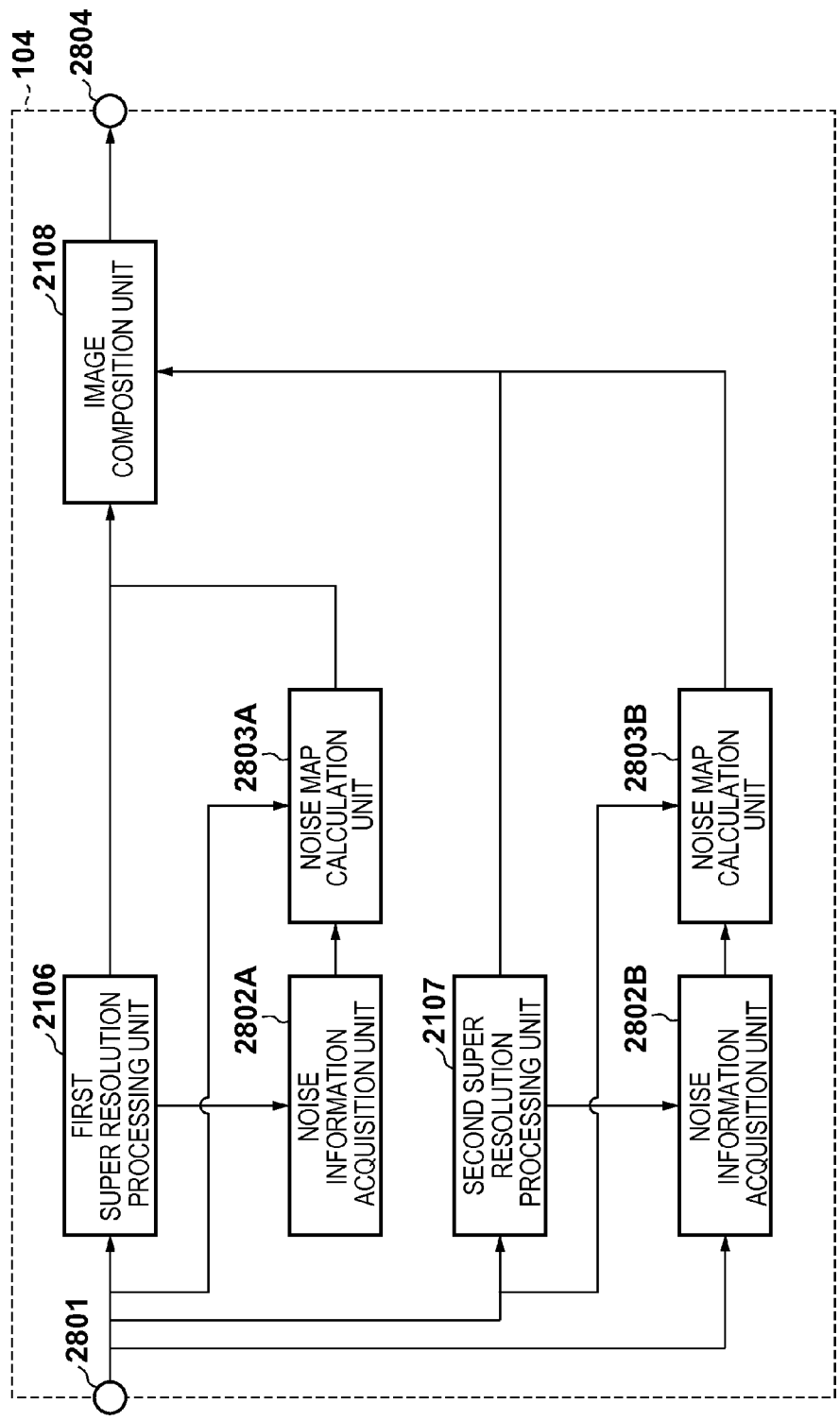
F I G. 28

IMAGE PROCESSING APPARATUS, IMAGE PROCESSING METHOD, AND COMPUTER READABLE STORAGE MEDIUM FOR IMPROVING SHARPNESS

BACKGROUND OF THE INVENTION

Field of the Invention

The present invention relates to an image processing technique for image data.

Description of the Related Art

In an image capturing apparatus such as a digital camera or a digital video camera, light from an object is guided onto a CCD or CMOS sensor serving as an image capturing device via an image capturing optical system formed from lenses and the like to form an image. The light that is to reach the image capturing device passes through the image capturing optical system and is therefore affected by the image capturing optical system. For this reason, the captured image blurs and lacks sharpness. There is known a method of recovering sharpness using an inverse filter that corrects the blur characteristic of the image capturing optical system. Japanese Patent Laid-Open No. 2010-258628 discloses a technique of controlling the inverse filter in accordance with a noise amount that increases due to the influence of the inverse filter.

Super resolution technologies for generating a high-resolution video from a low-resolution video have a problem of tradeoff between noise and sharpness. For example, a learning-based super resolution technology generates an image of high sharpness in general. However, the output image readily includes noise, and a faulty image is sometimes generated. On the other hand, a reconstruction-based super resolution technique can generate only an image of relatively low sharpness, though the output image includes no noise.

However, since the noise amount perceived by human vision is not linear, correction by the filter is insufficient or excessive in the technique described in Japanese Patent Laid-Open No. 2010-258628. How noise looks changes depending on the background image, that is, a visual masking effect is known. The technique described in Japanese Patent Laid-Open No. 2010-258628 cannot sufficiently recover a blur because the masking effect is produced in a high-frequency texture region.

In the super resolution technologies as well, the problem of tradeoff between sharpness and noise is not sufficiently solved.

The present invention has been made in consideration of the above problems, and provides an image processing method of performing image processing in consideration of tradeoff between sharpness and noise.

SUMMARY OF THE INVENTION

According to one aspect of the present invention, there is provided an image processing apparatus comprising: an acquisition unit configured to acquire, an evaluation value concerning noise for each region of an image frame corresponding to image data; and a control unit configured to control image processing of each region of the image frame corresponding to the image data in accordance with the evaluation value.

Further features of the present invention will become apparent from the following description of exemplary embodiments (with reference to the attached drawings).

BRIEF DESCRIPTION OF THE DRAWINGS

FIG. 23 is a block diagram showing the arrangement of an image composition unit according to the fifth embodiment;

FIG. 24 is a block diagram showing the arrangement of an image addition unit according to the fifth embodiment;

FIG. 28 is a block diagram showing the arrangement of an image processing unit according to the eighth embodiment;

DESCRIPTION OF THE EMBODIMENTS

The embodiments of the present invention will now be described with reference to the accompanying drawings.

First Embodiment

The first embodiment will be described. In this embodiment, a noise perception amount that expresses noise perceptibility by human is calculated. The noise perception amount here is a noise map that maps noise perceptibility according to the image structure of a captured image based on a noise sensitivity model. The correction amount of a correction filter configured to correct a blur that has occurred in a captured image is decided using the noise perception amount. Since this enables correction according to the perceptibility of noise in the captured image, it is possible to perform processing of improving sharpness while making noise unnoticeable. Regarding the noise sensitivity model, there exists a technique described in the literature 1 (S. Daly, "The Visible Differences Predictor: An algorithm for the assessment of image fidelity," in A. B. Watson, editor, Digital Image and Human Vision, pp. 179-206, Cambridge, Mass., MIT Press, 1993). In this embodiment, a case where a noise sensitivity model described in the literature is used will be exemplified.

<Arrangement of Entire System>

Figure 1:
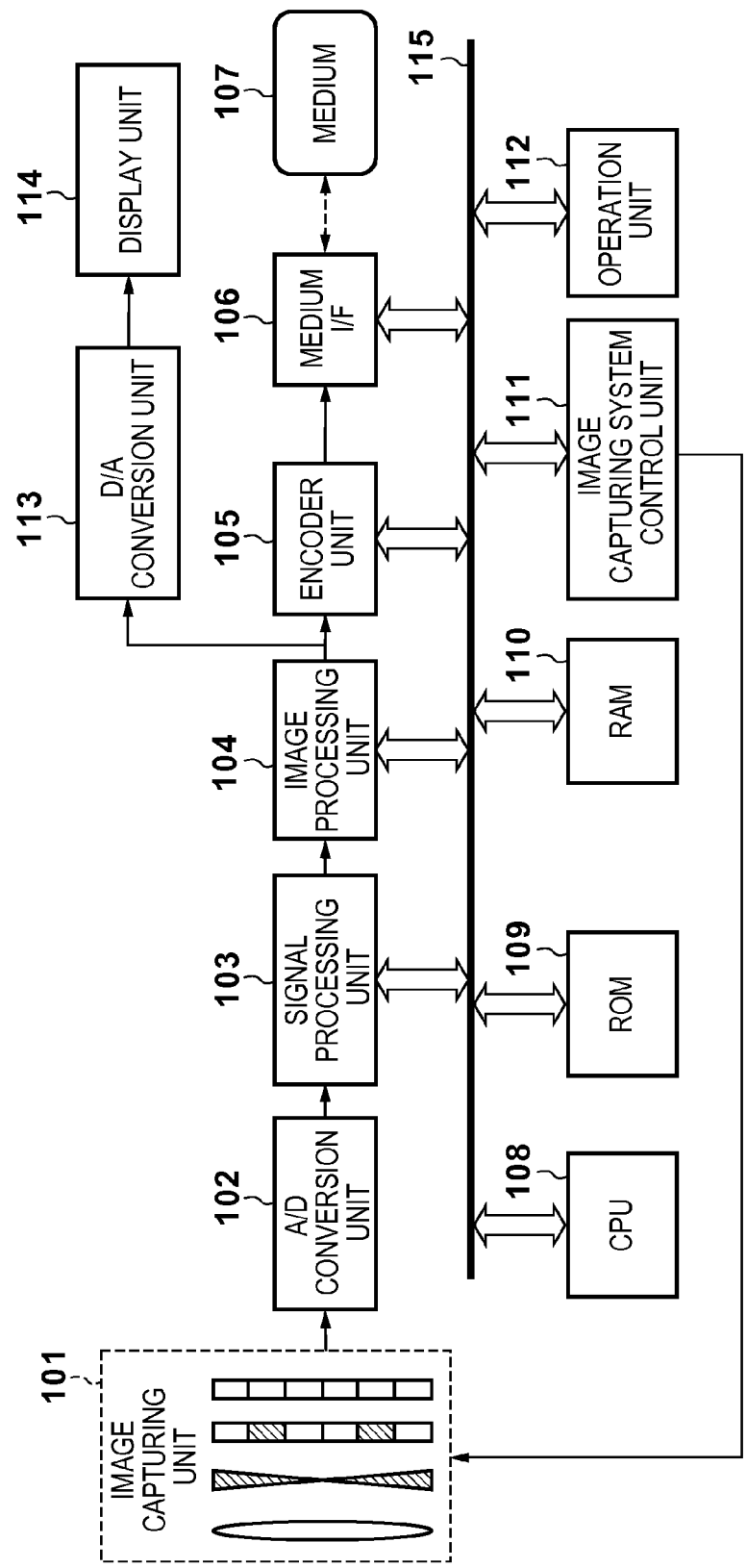
FIG. 1 is a block diagram showing the arrangement of a digital camera.

FIG. 1 is a block diagram showing an example of the arrangement of a digital camera (image capturing apparatus) including an image processing apparatus according to this embodiment. An image capturing unit 101 includes a zoom lens, a focus lens, a blur correction lens, a stop, a shutter, an optical low-pass filter, an iR cut filter, a color filter, and a sensor (solid-state image sensor) such as a CMOS or CCD sensor, and detects the light amount of an object. An A/D conversion unit 102 converts the light amount of the object into a digital value. A signal processing unit 103 performs demosaicing processing, white balance processing, gamma processing, and the like for the digital value converted by the A/D conversion unit 102, and generates a digital image.

An image processing unit 104 performs noise reduction processing for the digital image generated by the signal processing unit 103. An encoder unit 105 performs processing of converting the digital image that has undergone the noise reduction processing into a video compression format such as JPEG. A medium interface (I/F) 106 is an interface used to connect the apparatus to a medium 107. The medium 107 is, for example, a hard disk, a memory card, a CF card, an SD card, or a USB memory.

A CPU 108 is involved in all processes of the components of the digital camera. The CPU 108 sequentially loads instructions stored in a ROM 109 or a RAM 110 and executes processing. The CPU 108 controls the components of the digital camera via a system bus 115. The ROM 109 and the RAM 110 provide the CPU 108 with programs, data, work areas, and the like necessary for processing to be executed by the CPU 108.

An image capturing system control unit 111 controls the image capturing system in accordance with an instruction from the CPU 108 by, for example, focusing, opening the shutter, or adjusting the stop.

An operation unit 112 includes buttons, dials, and the like and receives user instructions input via them. The user instructions include shooting settings such as ISO speed setting, shutter speed setting, and f-number setting. These shooting settings are reflected on the shooting conditions of the digital camera and stored in the RAM 110 by the CPU 108.

A D/A conversion unit 113 performs analog conversion for the digital image that has undergone the noise reduction processing, and outputs the result as captured image data. A display unit 114 displays the captured image data received from the D/A conversion unit 113. A the display unit 114, for example, a liquid crystal display is used.

<Image Processing Unit 104>

Figure 2:
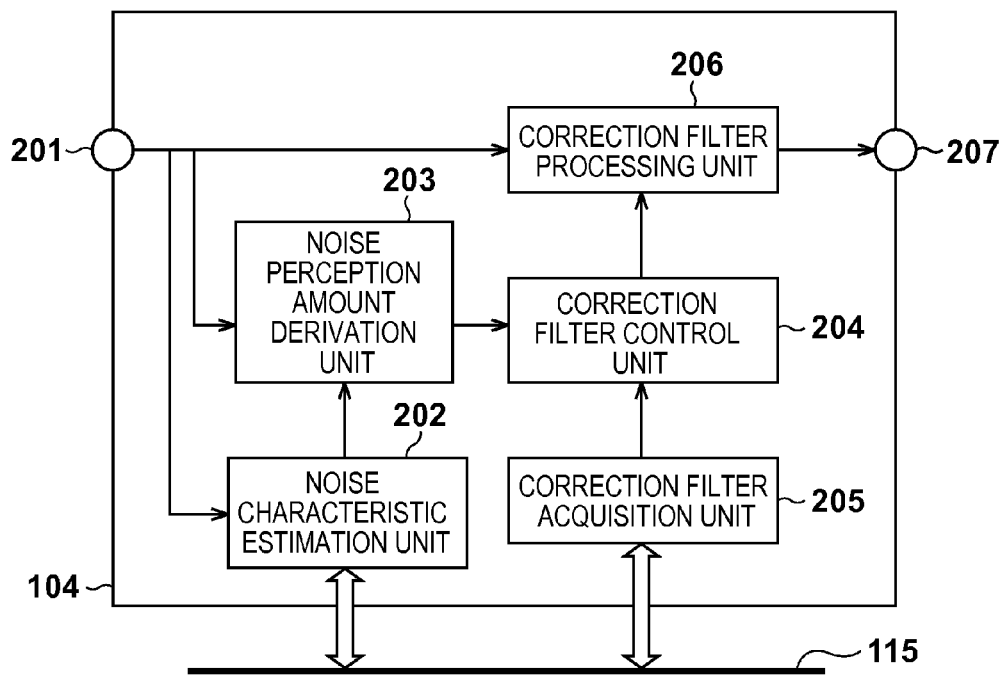
FIG. 2 is a block diagram showing the arrangement of an image processing unit according to the first embodiment.

FIG. 2 is a block diagram showing an example of the arrangement of the image processing unit 104. An example of the outline of the operation of the image processing unit 104 will be described with reference to FIG. 2. In this embodiment, the image processing unit 104 corresponds to an image processing apparatus. A digital image generated by the signal processing unit 103 is input from a terminal 201. A noise characteristic estimation unit 202 acquires image capturing conditions stored in the RAM 110, and estimates (derives) a noise characteristic based on the acquired image capturing conditions. Detailed noise characteristic derivation processing will be described later.

Based on the digital image generated by the signal processing unit 103 and the noise characteristic generated by the noise characteristic estimation unit 202, a noise perception amount derivation unit 203 calculates a noise perception amount that is a value evaluating perceptibility of noise in the captured image. Detailed noise perception amount derivation processing will be described later.

A correction filter acquisition unit 205 acquires a correction filter that is stored in the RAM 110 and configured to correct a blur of a captured image caused by the optical characteristic of the image capturing optical system of the image capturing unit 101. Detailed correction filter acquisition processing will be described later. A correction filter control unit 204 controls the correction amount of the correction filter acquired by the correction filter acquisition unit 205 based on the noise perception amount calculated by the noise perception amount derivation unit 203, and transmits the correction filter after the correction amount control to a correction filter processing unit 206. Detailed correction amount control processing of the correction filter will be described later.

Based on the correction filter after the correction amount control of the correction filter control unit 204, the correction filter processing unit 206 performs correction filter processing for the digital image generated by the signal processing unit 103. The digital image that has undergone the correction filter processing is output from a terminal 207. The correction filter processing can be known filter processing, and filter convolution processing is performed for the digital image.

<Noise Characteristic Estimation Unit 202>

Figure 3:
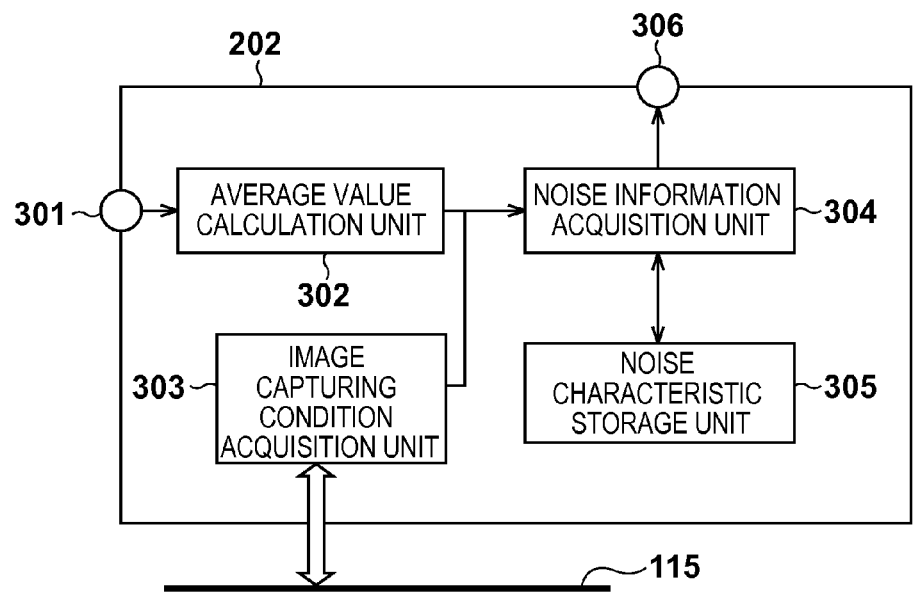
FIG. 3 is a block diagram showing the arrangement of a noise characteristic estimation unit according to the first embodiment.

FIG. 3 is a block diagram showing an example of the arrangement of the noise characteristic estimation unit 202. An example of the operation of the noise characteristic estimation unit 202 will be described with reference to FIG. 3. A digital image $i_{in}(x, y)$ generated by the signal processing unit 103 is input from a terminal 301. Here, x represents a position (pixel) in the horizontal (lateral) direction; and y, a position (pixel) in the vertical (longitudinal) direction. The digital image $i_{in}(x, y)$ is, for example, a luminance value or pixel value at a position represented by (x, y). An average value calculation unit 302 calculates an average value $avg_{in}$ (at each position (x, y)) of the digital image $i_{in}(x, y)$, and transmits it to a noise information acquisition unit 304. An image capturing condition acquisition unit 303 acquires image capturing conditions upon capturing the digital image $i_{in}(x, y)$ from the RAM 110. Here, the image capturing conditions are conditions concerning exposure at the time of image capturing. In this embodiment, the image capturing condition acquisition unit 303 acquires an ISO speed, lens aperture value, and exposure time as the image capturing conditions.

A noise characteristic storage unit 305 stores the relationship between the image capturing conditions, the average value $avg_{in}$ of the digital image $i_{in}(x, y)$, and a variance σn of noise in advance as a table or relational expression. The noise information acquisition unit 304 acquires the variance σn of noise corresponding to the image capturing conditions acquired by the image capturing condition acquisition unit 303 and the average value $avg_{in}$ of the digital image $i_{in}(x, y)$ calculated by the average value calculation unit 302 from the noise characteristic storage unit 305. The variance σn of noise is output from a terminal 306 as a noise characteristic. The noise characteristic need not always be the variance σn of noise as long as the value quantitatively evaluates the amount of noise in the captured image. For example, an RMS grain size, a Wiener spectrum, or the like may be employed as the noise characteristic.

<Noise Perception Amount Derivation Unit 203>

Figure 4:
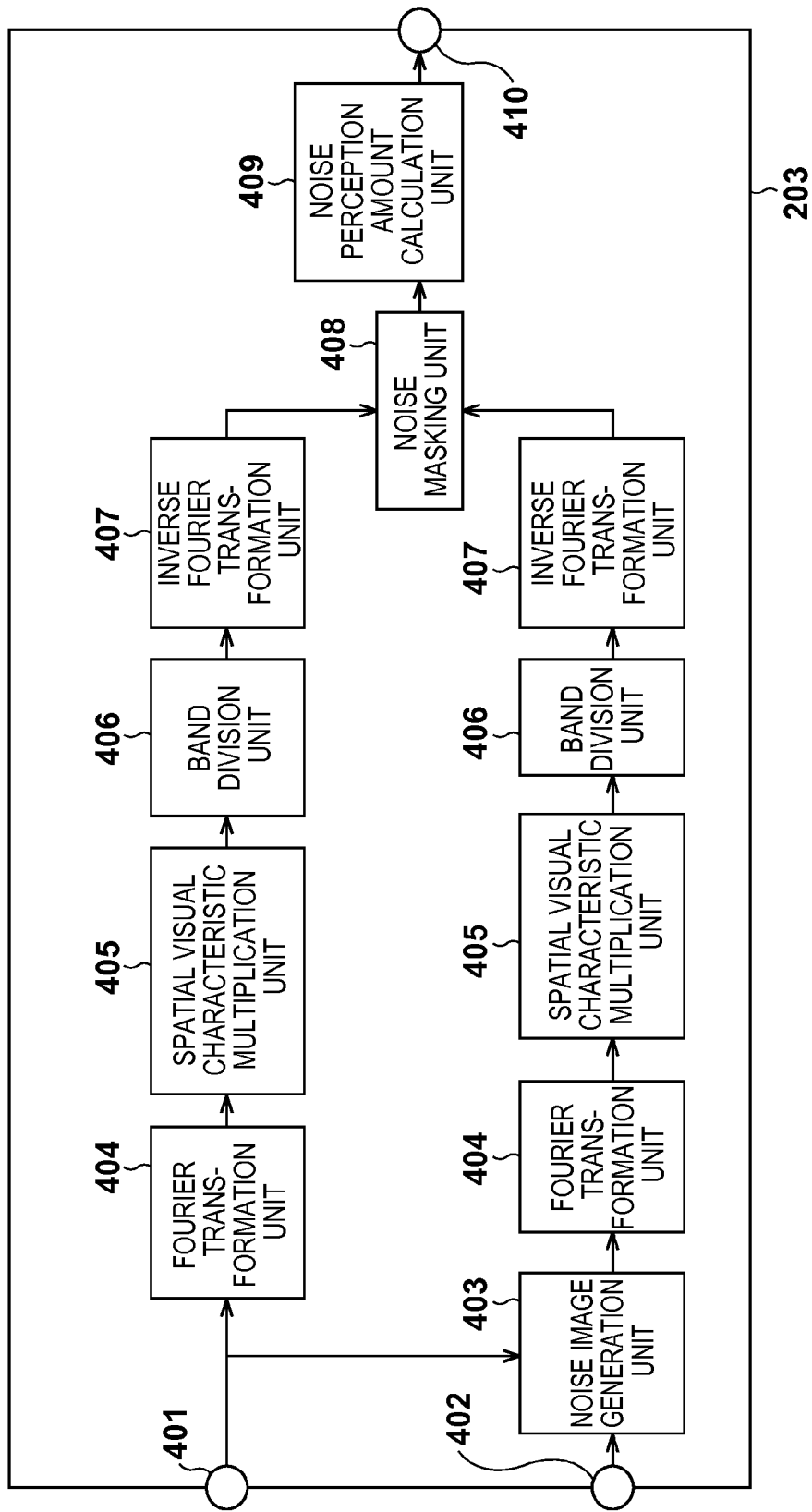
FIG. 4 is a block diagram showing the arrangement of a noise perception amount derivation unit according to the first embodiment.

FIG. 4 is a block diagram showing an example of the arrangement of the noise perception amount derivation unit 203. An example of the operation of the noise perception amount derivation unit 203 will be described with reference to FIG. 4. The digital image $i_{in}(x, y)$ generated by the signal processing unit 103 is input from a terminal 401. The variance σn of noise obtained by the noise characteristic estimation unit 202 is input from a terminal 402. A noise image generation unit 403 generates a white noise image $n_w(x, y)$ in the same size as the digital image $i_{in}(x, y)$ such that the variance of noise becomes the variance σn of noise input from the terminal 402. The white noise image $n_w(x, y)$ represents the magnitude of white noise at the position (pixel) (x, y). The noise image generation unit 403 generates a noise image n(x, y) by adding the digital image $i_{in}(x, y)$ and the white noise image $n_w(x, y)$. The noise image generation unit 403 thus generates an image representing noise caused in the captured image by pseudo simulation. Note that the white noise need not always be used as long as the image representing noise caused in the captured image can be generated by pseudo simulation.

Fourier transformation units 404 perform Fourier transformation for the digital image $i_{in}(x, y)$ and the noise image n(x, y) and generate the information of the spatial frequencies of the digital image $i_{in}(x, y)$ and the noise image n(x, y), respectively. The result of performing Fourier transformation for the digital image $i_{in}(x, y)$ to obtain the function of spatial frequency will be referred to as $I_{in}(u, v)$ hereinafter. In addition, the result of performing Fourier transformation for the noise image n(x, y) to obtain the function of spatial frequency will be referred to as N(u, v). Here, u is the spatial frequency (horizontal frequency) in the horizontal direction, and v is the spatial frequency (vertical frequency) in the vertical direction.

Spatial visual characteristic multiplication units 405 multiply the digital image $I_{in}(u, v)$ after Fourier transformation and the noise image N(u, v) after Fourier transformation by a spatial visual characteristic VTF(u, v), respectively. The spatial visual characteristic VTF(u, v) represents the relationship between the contrast sensitivity and the spatial frequency and is defined by $$VTF(u,v) = VTFx(u) \times VTFy(v) \quad (1)$$

where VTFx(u) is the spatial visual characteristic in the horizontal (lateral) direction, and VTFy(v) is the spatial visual characteristic in the vertical (longitudinal) direction. They are respectively defined by $$VTFsx(u) = \\ 5.05 \cdot \left(1 - \exp\left(-0.1 \cdot \frac{R \cdot \pi}{Nx \cdot p \cdot 180} u\right)\right) \cdot \exp\left(-0.138 \cdot \frac{R \cdot \pi}{Nx \cdot p \cdot 180} \cdot u\right) \quad (2)$$

$$VTFsy(v) = \\ 5.05 \cdot \left(1 - \exp\left(-0.1 \cdot \frac{R \cdot \pi}{Ny \cdot p \cdot 180} v\right)\right) \cdot \exp\left(-0.138 \cdot \frac{R \cdot \pi}{Ny \cdot p \cdot 180} \cdot v\right) \quad (3)$$

where p is the pixel pitch (mm), R is the visual range (mm), Nx is the number of pixels in the horizontal (lateral) direction of the image, and Ny is the number of pixels in the vertical (longitudinal) direction of the image. These values are defined based on a general user observation environment. Note that the spatial visual characteristic VTFx(u) in the horizontal (lateral) direction and the spatial visual characteristic VTFy(v) in the vertical (longitudinal) direction have the same fundamental form which is obtained by sampling a spatial visual characteristic represented by $$\text{spatial visual characteristic} = 5.05 \times [1 - \exp(-0.1 \times x)] \times \exp(-0.138 \times x) \quad (4)$$

in the frequency space in accordance with the visual range, the pixel pitch, and the number of pixels.

Figure 5:
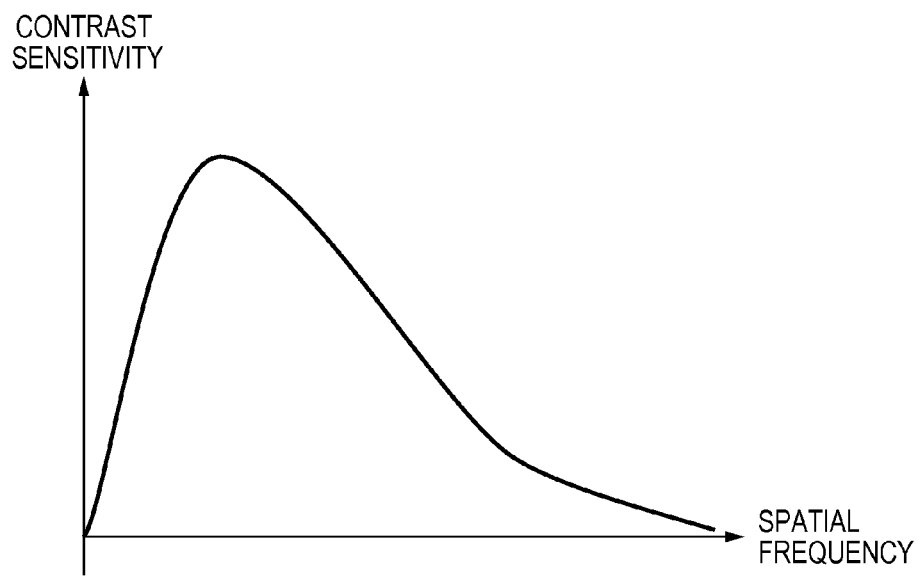
FIG. 5 is a graph showing a spatial visual characteristic.

FIG. 5 is a graph schematically showing an example of the spatial visual characteristic. The result of multiplying the digital image $I_{in}(u, v)$ after Fourier transformation by the spatial visual characteristic VTF(u, v) will be referred to as IV(u, v) hereinafter. In addition, the result of multiplying the noise image N(u, v) after Fourier transformation by the spatial visual characteristic VTF(u, v) will be referred to as NV(u, v). IV(u, v) represents the signal of a captured image at a spatial frequency sensible in human vision. NV(u, v) represents the signal of a noise image at a spatial frequency sensible in human vision.

Band division units 406 calculate band-divided frequency information $Is_{k,l}(u, v)$ for the digital image represented by equation (5) below and band-divided frequency information $Ns_{k,l}(u, v)$ for the noise image represented by equation (6) below, respectively. The band-divided frequency information $Is_{k,l}(u, v)$ is information obtained by dividing the digital image IV(u, v) that has undergone Fourier transformation and spatial visual characteristic multiplication into a plurality of spatial frequency bands. The band-divided frequency information $Ns_{k,l}(u, v)$ is information obtained by dividing the noise image NV(u, v) that has undergone Fourier transformation and spatial visual characteristic multiplication into a plurality of spatial frequency bands.

$$Is_{k,l}(u,v) = Iv(u,v) \cdot cortex_{k,l}(u,v) \quad (5)$$

$$Ns_{k,l}(u,v) = Nv(u,v) \cdot cortex_{k,l}(u,v) \quad (6)$$

A band division filter $cortex_{k,l}(u, v)$ is obtained by combining the characteristic in the radial direction and that in the circumferential direction of a spatial frequency domain, and defined by $$\text{cortex\_pol}_{k,l}(\rho, \theta) = \begin{cases} dom_k(\rho) \cdot fan_l(\theta) & \text{for } k = 1, K-1; l = 1, L \\ base(\rho) & \text{for } k = K \end{cases} \quad (7)$$

$$\text{cortex}_{k,l}(u, v) = \text{cortex\_pol}_{k,l}\left(\sqrt{u^2 + v^2}, \arctan\left(\frac{v}{u}\right)\right) \quad (8)$$

cortex_pol$_{k,l}(\rho, \theta)$ expresses the band division filter cortex$_{k,l}(u, v)$ by polar coordinates. In equations (7) and (8), K is the division number of the spatial frequency band in the radial direction, and L is the division number of the spatial frequency band in the circumferential direction. In general, K=6, and L=6. In addition, $fan_l(\theta)$, $dom_k(\rho)$, and $base(\rho)$ of equation (7) are defined by $$fan_l(\theta) = \begin{cases} \frac{1}{2}\left\{1 + \cos\left[\frac{\pi|\theta_{tw} - \theta_c(l)|}{\theta_{tw}}\right]\right\} \cdot fan_l(\theta) & \text{for } |\theta_{tw} - \theta_c(l)| \le \theta_{tw} \\ 0 & \text{for } |\theta_{tw} - \theta_c(l)| > \theta_{tw} \end{cases} \quad (9)$$

$$\theta_c(l) = (l-1) \cdot \theta_{tw} - 90 \quad (10)$$

$$\theta_{tw} = \frac{180}{L} \quad (11)$$

$$dom_k(\rho) = \begin{cases} mesa(\rho)|_{\rho_h=2^{-(k-1)}} - mesa(\rho)|_{\rho_h=2^{-k}} & \text{for } k = 1, K-2 \\ mesa(\rho)|_{\rho_h=2^{-(k-1)}} - base(\rho)|_{\rho_h=2^{-k}} & \text{for } k = K-1 \end{cases} \quad (12)$$

$$mesa(\rho) = \quad (13)$$
$$\begin{cases} 1 & \text{for } \rho < \rho_h - \frac{tw}{2} \\ \frac{1}{2}\left(1 + \cos\left(\frac{\pi(\rho - \rho_h + \frac{tw}{2})}{tw}\right)\right) & \text{for } \rho_h - tw/2 < \rho < \rho_h + \frac{tw}{2} \\ 0 & \text{for } \rho > \rho_h + \frac{tw}{2} \end{cases}$$

$$base(\rho) = \begin{cases} \exp\left(-\frac{\rho^2}{2\sigma^2}\right) & \text{for } \rho < \rho_h + \frac{tw}{2} \\ 0 & \text{for } \rho \ge \rho_h + \frac{tw}{2} \end{cases} \quad (14)$$

$$\rho_h = 2^{-K} \quad (15)$$

$$tw = \frac{2}{3}\rho_h \quad (16)$$

$$\sigma = \frac{1}{3}\left(\rho_h + \frac{tw}{2}\right) \quad (17)$$

Figure 6:
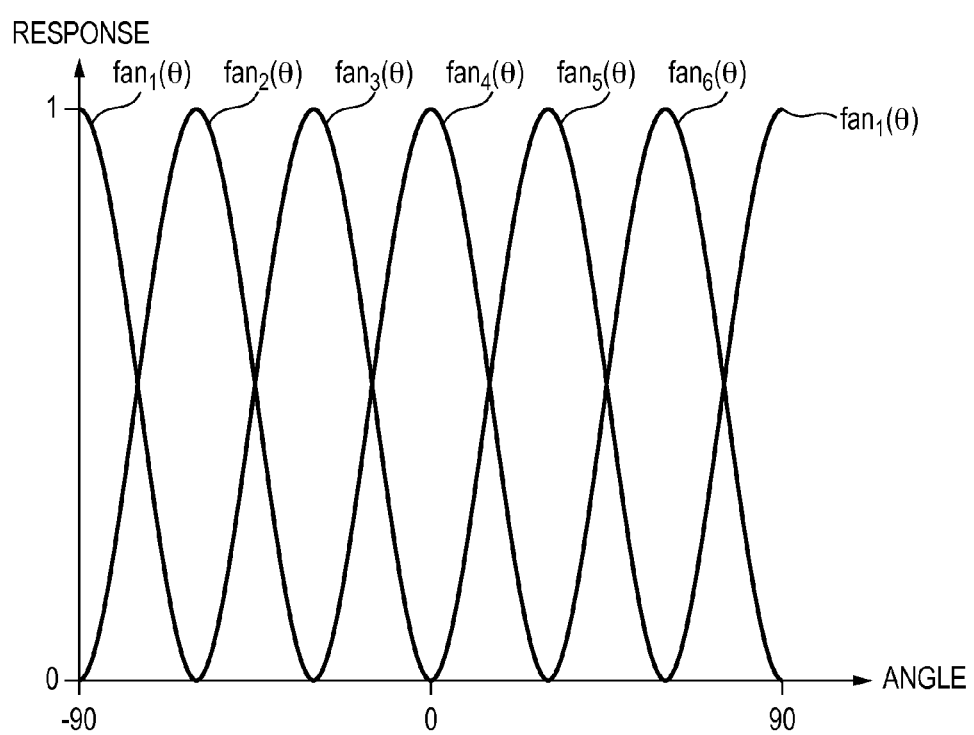
FIG. 6 is a graph showing $\text{fan}_f(\theta)$.
Figure 7:
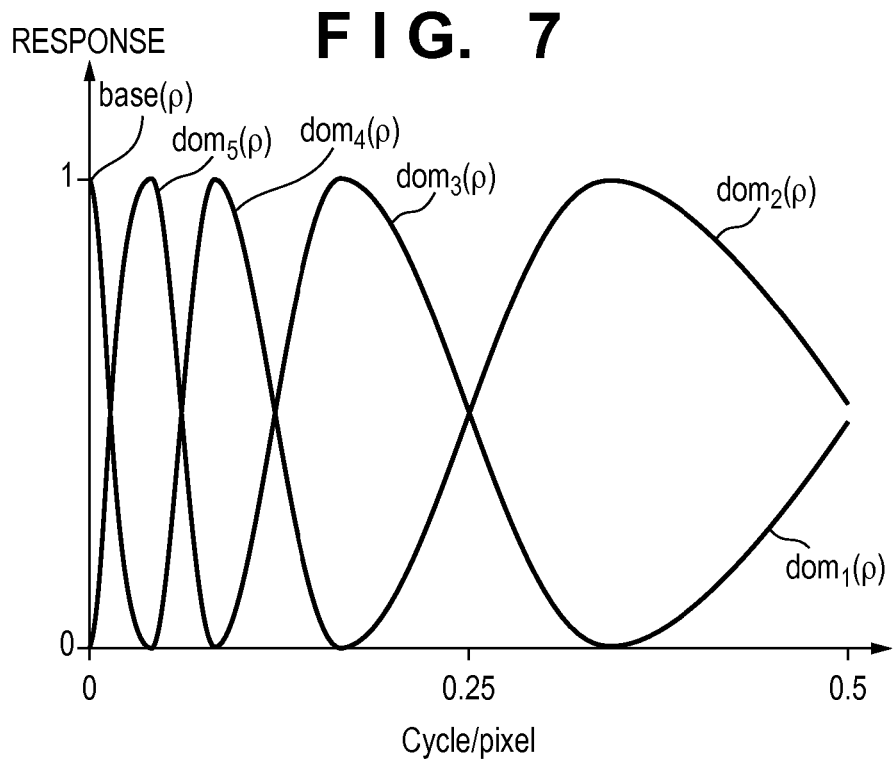
FIG. 7 is a graph showing $\text{dom}_k(\rho)$.
Figure 8:
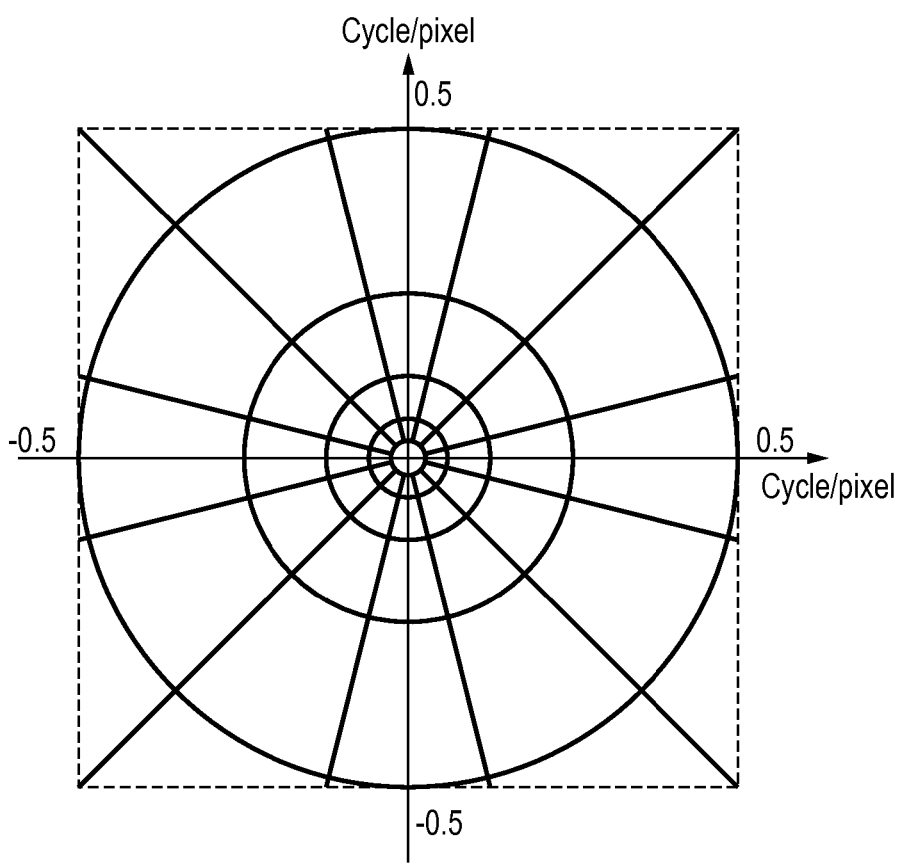
FIG. 8 is a view showing an example of a band-divided spatial frequency domain according to the first embodiment.

FIG. 6 is a graph schematically showing $fan_l(\theta)$ when L=6. Referring to FIG. 6, the abscissa represents the angle, and the ordinate represents the response. FIG. 7 is a graph schematically showing $dom_k(\rho)$ when K=6. Referring to FIG. 7, the abscissa represents the normalized frequency, and the ordinate represents the response. FIG. 8 is a view schematically showing a spatial frequency domain divided by the band division filter cortex$_{k,l}(u, v)$. Referring to FIG. 8, both the abscissa and the ordinate represent the normalized frequency. In FIG. 8, the half frequency of each filter is indicated by a thick solid line.

Considering here that human vision discriminates high and low spatial frequencies of an image and also discriminates the direction (longitudinal direction, lateral direction, and oblique direction) of each spatial frequency of the image, each of these discriminated spatial frequency domains is defined as one domain. This one domain corresponds to a domain surrounded by thick lines in FIG. 8. Referring to FIG. 8, if the spatial frequency of a digital image and that of a noise image exist in the same domain, noise based on the noise image is difficult to visually recognize by human vision on the digital image.

Inverse Fourier transformation units 407 perform inverse Fourier transformation for the pieces of band-divided frequency information Is$_{k,l}(u, v)$ and Ns$_{k,l}(u, v)$ and generate a digital image and a noise image each of which is divided into a plurality of spatial frequency bands. A band-divided image obtained as the result of inverse Fourier transformation of the band-divided frequency information Is$_{k,l}(u, v)$ for the digital image will be referred to as is$_{k,l}(x, y)$ hereinafter. In addition, a band-divided image obtained as the result of inverse Fourier transformation of the band-divided frequency information Ns$_{k,l}(u, v)$ for the noise image will be referred to as ns$_{k,l}(x, y)$. Each band-divided image is the image of each spatial frequency band divided by the band division filter cortex$_{k,l}(u, v)$.

A noise masking unit (partial noise perception amount calculation unit) 408 performs masking for the band-divided image ns$_{k,l}(x, y)$ of the noise image based on the band-divided image is$_{k,l}(x, y)$ of the digital image. A perceived noise image P$_{k,l}(x, y)$ (partial noise perception amount) that is a noise image to be perceived is thus calculated. The perceived noise image P$_{k,l}(x, y)$ is calculated for each spatial frequency band. Masking here means superimposing noise on the captured image, thereby evaluating how high the degree of difficulty in perception of the noise by human is. An example of the detailed processing of the noise masking unit 408 will be described. First, the noise masking unit 408 calculates a masking intensity Te$_{k,l}(x, y)$ by $$Te_{k,l}(x, y) = (1 + (k_1(k_2 \cdot is_{k,l}(x, y))^s)^b)^{\frac{1}{b}} \quad (18)$$

$$k_1 = W^{(1-1/(1-Q))} \quad (19)$$

$$k_2 = W^{(1/(1-Q))} \quad (20)$$

Figures 9, 10:
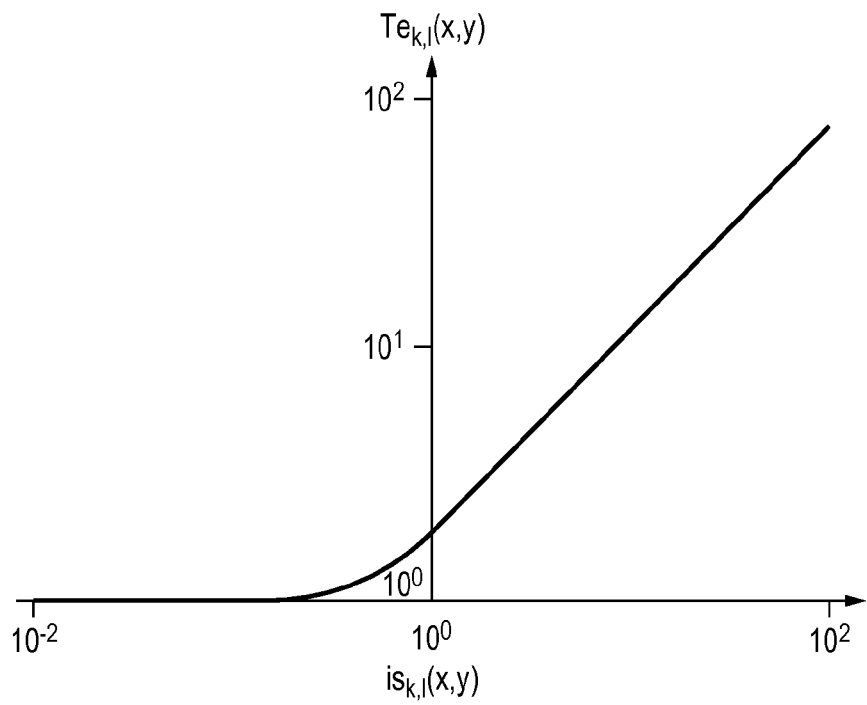
FIG. 9 is a graph showing the relationship between a masking intensity and a band-divided image.
FIG. 10 is a table storing the correction coefficients of a correction filter according to the first embodiment.

In this embodiment, W=6, Q=0.7, b=4, and s=0.8 in equations (18) to (20). FIG. 9 is a graph showing an example of the relationship between masking intensity Te$_{k,l}(x, y)$ and the band-divided image is$_{k,l}(x, y)$. Referring to FIG. 9, the abscissa represents the intensity of the band-divided image is$_{k,l}(x, y)$ on a logarithmic scale. The ordinate represents the intensity of the masking intensity Te$_{k,l}(x, y)$ on a logarithmic scale. Using the masking intensity Te$_{k,l}(x, y)$, the noise masking unit 408 calculates the perceived noise image P$_{k,l}(x, y)$ by $$P_{k,l}(x, y) = 1 - \exp\left\{-\frac{ns_{k,l}(x, y)}{m} \Big/ Te_{k,l}(x, y)\right\} \quad (21)$$

where m is the average value of the digital image $i_{in}(x, y)$. A noise perception amount calculation unit 409 composites the perceived noise images P$_{k,l}(x, y)$ of the respective spatial frequency bands and calculates a noise perception amount P(x, y) by $$P(x, y) = \sum_{k=1}^{K} \sum_{l=1}^{L} P_{k,l}(x, y) \quad (22)$$

The noise perception amount P(x, y) is output from a terminal 410.

<Correction Filter Acquisition Unit 205>

An example of the operation of the correction filter acquisition unit 205 will be described. The correction filter acquisition unit 205 acquires a correction filter f(i, j) from the RAM 110 and outputs it to the correction filter control unit 204. The RAM 110 stores the table or relational expression of correction coefficients of the correction filter f(i, j) according to the optical characteristic of the image capturing optical system of the image capturing unit 101, the lens aperture values, and the zoom positions. FIG. 10 is a view showing an example of a table storing the correction coefficients of the correction filter f(i, j) according to the lens aperture values and the zoom positions.

<Correction Filter Control Unit 204>

Figure 11:
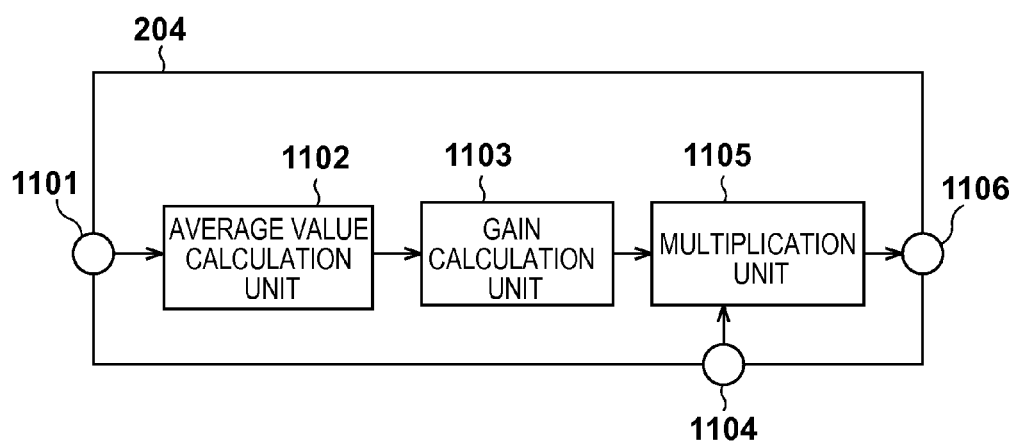
FIG. 11 is a block diagram showing the first example of the arrangement of a correction filter control unit according to the first embodiment.

FIG. 11 is a block diagram showing an example of the arrangement of the correction filter control unit 204. An example of the operation of the correction filter control unit 204 will be described with reference to FIG. 11. The noise perception amount P(x, y) calculated by the noise perception amount derivation unit 203 is input from a terminal 1101. An average value calculation unit 1102 calculates an average value $avg_p$ of the noise perception amount P(x, y) (at each position (x, y)). A gain calculation unit 1103 calculates a gain g to multiply the correction filter f(i, j) based on the average value $avg_p$ of the noise perception amount P(x, y). Here, the gain g is calculated by $$g = k \times avg_p \qquad (23)$$

However, the calculation method of the gain g is not limited to equation (23).

In equation (23), k is a linear expression used to make the gain g small when the average value $avg_p$ of the noise perception amount P(x, y) is large or make the gain g large when the average value $avg_p$ is small. It is therefore possible to make the gain of the correction filter f(i, j) small when the noise perception amount P(x, y) is large or make the gain of the correction filter f(i, j) large when the noise perception amount P(x, y) is small. The correction filter f(i, j) acquired from the correction filter acquisition unit 205 is input from a terminal 1104. Using the gain g calculated by the gain calculation unit 1103 and the correction filter f(i, j) acquired from the correction filter acquisition unit 205, a multiplication unit 1105 calculates a correction filter fg(i, j) after correction amount control by $$fg(i,j) = g \times f(i,j) \qquad (24)$$

The correction filter fg(i, j) after correction amount control is output from a terminal 1106. As described above, in this embodiment, the variance σn of noise is derived based on the exposure conditions at the time of image capturing, and a noise image is generated by superimposing noise according to the variance σn of noise on the captured image. The information of a spatial frequency sensible in human vision is extracted from each of the captured image and the noise image and divided into a plurality of spatial frequency bands. The noise images divided into the plurality of spatial frequency bands are masked based on the captured images divided into the plurality of spatial frequency bands and then composited to calculate the noise perception amount P(x, y). The correction amount of the correction filter configured to correct the blur of the captured image is decided based on the noise perception amount P(x, y). Hence, image processing capable of obtaining the sharpness improving effect can be implemented while suppressing enhancement of noise that is an adverse effect produced by correcting the blur. It is therefore possible to reduce the blur that has occurred in the captured image so the noise is not perceived from the captured image.

Second Embodiment

The second embodiment will be described next. In the first embodiment, an example has been described in which the noise perception amount P(x, y) of the entire input image is calculated, and a uniform correction filter is applied to the entire input image. In this case, however, since the blur that has occurred in the captured image is not uniform because of the lens aberration, noise may be caused by the nonlinear distortion of the lenses and the influence thereof in accordance with the position of the captured image. To prevent this, in this embodiment, a correction filter having a different shape is acquired for each region of a captured image, and a noise perception amount is calculated for each region of the captured image. This makes it possible to form an image in which noise is more difficult to perceive, and the sharpness is further improved. As described above, this embodiment and the first embodiment are different mainly in the arrangement and processing based on calculating the noise perception amount for each region of a captured image and changing the shape of the correction filter between the regions of the captured image. Hence, the same reference numerals as in FIGS. 1 to 11 of the first embodiment denote the same parts in this embodiment, and a detailed description thereof will be omitted.

<Image Processing Unit 1200>

Figure 12:
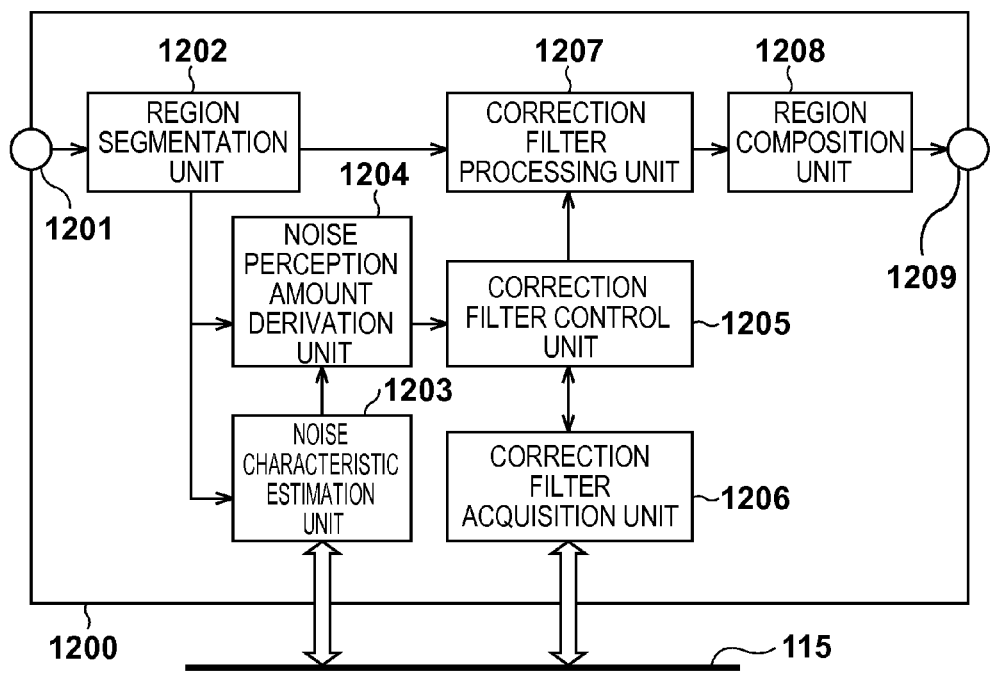
FIG. 12 is a block diagram showing the arrangement of an image processing unit according to the second embodiment.

FIG. 12 is a block diagram showing an example of the arrangement of an image processing unit 1200. An example of the operation of the image processing unit 1200 will be described with reference to FIG. 12. The image processing unit 1200 shown in FIG. 12 replaces the image processing unit 104 shown in FIG. 2. A digital image generated by a signal processing unit 103 is input to a terminal 1201. A region segmentation unit 1202 segments a digital image $i_{in}(x, y)$ into M×N rectangular regions. However, the method of segmenting the digital image $i_{in}(x, y)$ is not limited to this. The indices of rectangular regions are assigned from the upper left of the digital image $i_{in}(x, y)$ to the lower right. A rectangular region of the mth row and nth column will be referred to as $i_{m,n}$ hereinafter. The region segmentation unit 1202 outputs the portions of the rectangular regions $i_{m,n}$ corresponding to the assigned indices out of the digital image $i_{in}(x, y)$ in the order of index.

The operations of a noise characteristic estimation unit 1203 and a noise perception amount derivation unit 1204 are the same as those of the noise characteristic estimation unit 202 and the noise perception amount derivation unit 203 shown in FIG. 2, respectively. However, the noise characteristic estimation unit 1203 and the noise perception amount derivation unit 1204 perform processing not for the entire digital image $i_{in}(x, y)$ but for each rectangular region $i_{m,n}$ segmented by the region segmentation unit 1202. A correction filter acquisition unit 1206 acquires a correction filter corresponding to the position of each rectangular region $i_{m,n}$ segmented by the region segmentation unit 1202 from a RAM 110. Detailed correction filter acquisition processing will be described later.

A correction filter control unit 1205 controls the correction amount of the correction filter acquired by the correction filter acquisition unit 1206 based on the noise perception amount calculated by the noise perception amount derivation unit 1204, and transmits the correction filter after the correction amount control to a correction filter processing unit 1207. Detailed correction amount control processing of the correction filter will be described later.

Based on the correction filter after the correction amount control of the correction filter control unit 1205, the correction filter processing unit 1207 performs correction filter processing for the digital image $i_{in}(x, y)$ of each rectangular region $i_{m,n}$ output from the region segmentation unit 1202. A region composition unit 1208 arranges the rectangular regions $i_{m,n}$ in the order of index, composites them, and outputs an output image $i_{out}$. The output image $i_{out}$ is output from a terminal 1209.

<Correction Filter Acquisition Unit 1206>

Figures 13, 14:
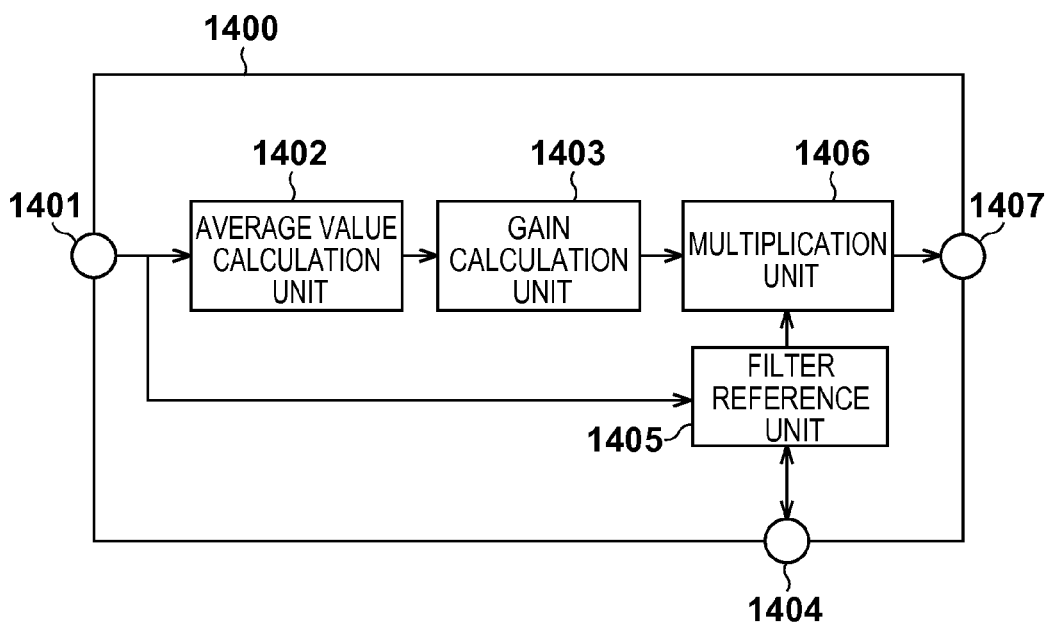
FIG. 13 is a table storing the correction coefficients of a correction filter according to the second embodiment.
FIG. 14 is a block diagram showing the arrangement of a correction filter control unit according to the second embodiment.

An example of the operation of the correction filter acquisition unit 1206 will be described. The correction filter acquisition unit 1206 acquires a correction filter $f(i, j)$ from the RAM 110 and outputs it to the correction filter control unit 1205. The RAM 110 stores the table or relational expression of correction coefficients of the correction filter according to the optical characteristic of the image capturing optical system of an image capturing unit 101, the lens aperture values, the zoom positions, and the coordinates of the rectangular regions $i_{m,n}$. FIG. 13 is a view showing an example of a table storing the correction coefficients of the correction filter $f(i, j)$ according to the lens aperture values, the zoom positions, and the coordinates of the rectangular regions $i_{m,n}$. Here, the coordinates of the rectangular regions $i_{m,n}$ indicate the indices assigned to the rectangular regions when the captured image is segmented by the region segmentation unit 1202.

<Correction Filter Control Unit 1205>

FIG. 14 is a block diagram showing an example of the arrangement of the correction filter control unit 1205. An example of the operation of the correction filter control unit 1205 will be described with reference to FIG. 14. The correction filter control unit 1205 shown in FIG. 14 replaces the correction filter control unit 204 shown in FIG. 11. A noise perception amount $P(x, y)$ in the rectangular region $i_{m,n}$, which is calculated by the noise perception amount derivation unit 1204, is input from a terminal 1401. An average value calculation unit 1402 calculates an average value $avg_{m,n}$ of the noise perception amount $P(x, y)$ (at each position $(x, y)$) in the rectangular region $i_{m,n}$. A gain calculation unit 1403 calculates a gain g to multiply the correction filter $f(i, j)$ based on the average value $avg_{m,n}$ of the noise perception amount $P(x, y)$ in the rectangular region $i_{m,n}$. Here, the gain g is calculated by $$g = k \times avg_{m,n} \quad (25)$$

However, the calculation method of the gain g is not limited to equation (25).

In equation (25), k is a linear expression used to make the gain g small when the average value $avg_{m,n}$ of the noise perception amount $P(x, y)$ in the rectangular region $i_{m,n}$ is large or make the gain g large when the average value $avg_{m,n}$ is small. The correction filter $f(i, j)$ acquired from the correction filter acquisition unit 1206 is input from a terminal 1404. A filter reference unit 1405 transmits the information of the index of the rectangular region $i_{m,n}$ currently under processing to the correction filter acquisition unit 1206, and acquires the correction filter $f(i, j)$ based on the index and the image capturing optical system of the image capturing unit 101.

Using the gain g calculated by the gain calculation unit 1403 and the correction filter $f(i, j)$ acquired by the filter reference unit 1405, a multiplication unit 1406 calculates a correction filter $fg(i, j)$ after correction amount control. The calculation of the correction filter after correction amount control can be done based on, for example, equation (24) described above. The correction filter $fg(i, j)$ after correction amount control is output from a terminal 1407.

As described above, in this embodiment, the noise perception amount $P(x, y)$ is calculated for each rectangular region of the captured image, and the correction amount used to correct the blur of the captured image is decided for each rectangular region. It is therefore possible to implement image processing of correcting the lens aberration which changes depending on the position of the captured image and also suppressing noise that is an adverse effect produced by correcting the blur.

Third Embodiment

The third embodiment will be described next. In the first and second embodiments, an example has been described in which the gain g of the correction filter $f(i, j)$ is controlled in accordance with the noise perception amount $P(x, y)$, thereby correcting the captured image so as to make noise difficult to perceive. In this method, it is uncertain whether the noise perception amount of an image after blur correction is close to the target noise perception amount. In this embodiment, a correction filter is selected from a plurality of correction filters and composited such that the noise perception amount of an image after blur correction becomes close to the target noise perception amount. As described above, this embodiment and the first and second embodiments are different mainly in the arrangement and processing for selecting a correction filter such that the noise perception amount of an image after blur correction becomes close to the target value of the noise perception amount. Hence, the same reference numerals as in FIGS. 1 to 14 of the first and second embodiments denote the same parts in this embodiment, and a detailed description thereof will be omitted.

<Image Processing Unit 1500>

Figure 15:
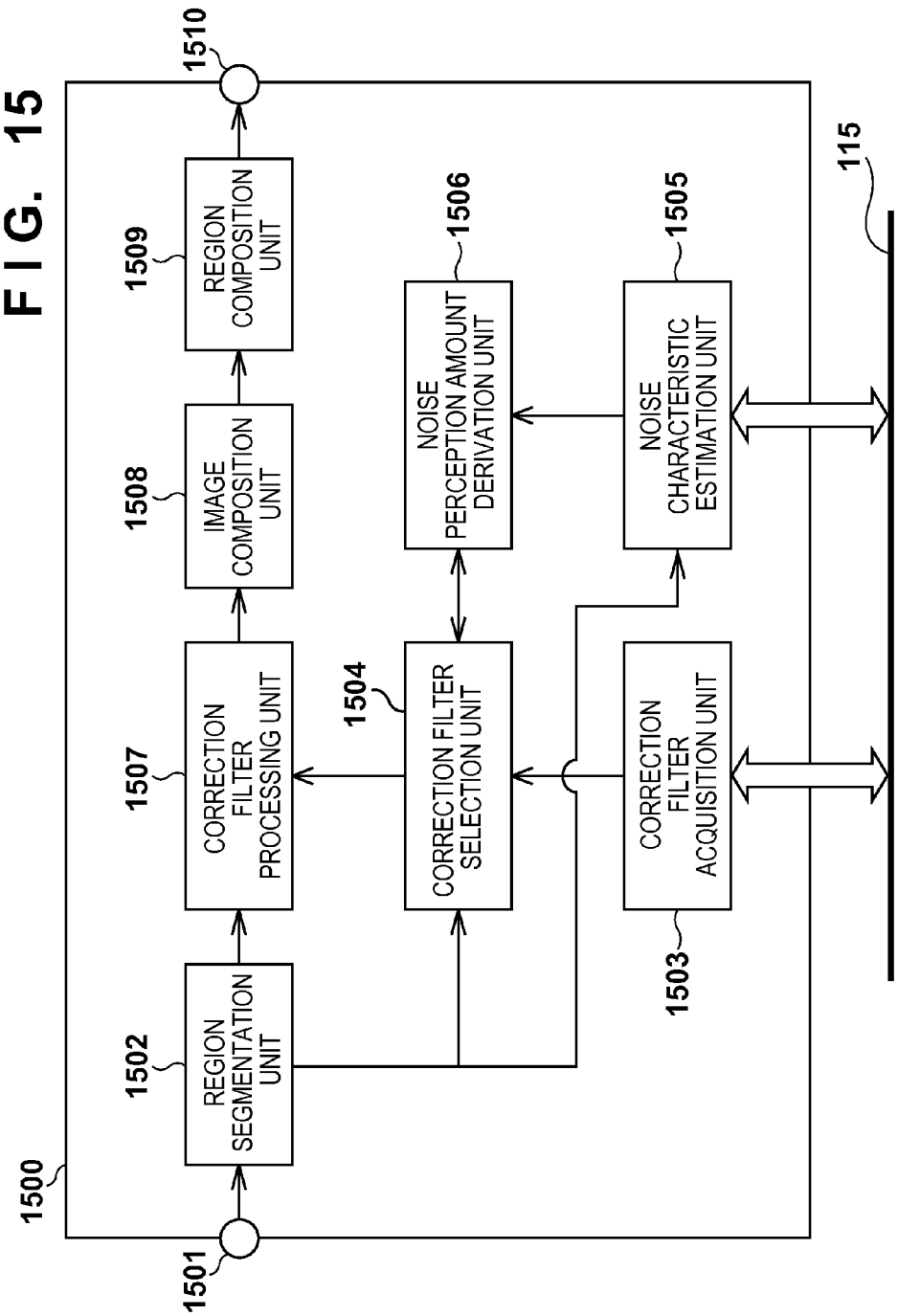
FIG. 15 is a block diagram showing the arrangement of an image processing unit according to the third embodiment.

FIG. 15 is a block diagram showing an example of the arrangement of an image processing unit 1500. An example of the operation of the image processing unit 1500 will be described with reference to FIG. 15. The image processing unit 1500 shown in FIG. 15 replaces the image processing units 104 and 1200 shown in FIGS. 2 and 12. A digital image generated by a signal processing unit 103 is input to a terminal 1501. A region segmentation unit 1502 is the same as the region segmentation unit 1202 of the second embodiment. The region segmentation unit 1502 outputs the images of rectangular regions $i_{m,n}$ out of a digital image $i_{in}(x, y)$ in the order of index of the rectangular region $i_{m,n}$.

A correction filter acquisition unit 1503 acquires a plurality of correction filters having different shapes corresponding to the position of each rectangular region $i_{m,n}$ segmented by the region segmentation unit 1502 from a RAM 110. A noise characteristic estimation unit 1505 is the same as the noise characteristic estimation unit 1203 of the second embodiment. The noise characteristic estimation unit 1505 estimates the noise characteristic (for example, calculates a variance σn of noise) for each rectangular region $i_{m,n}$ segmented by the region segmentation unit 1502. Based on the noise characteristic acquired from the noise characteristic estimation unit 1505 and the correction filters acquired from the correction filter acquisition unit 1503, a noise perception amount derivation unit 1506 calculates a noise perception amount after filter processing. Detailed noise perception amount calculation processing will be described later.

A correction filter selection unit 1504 selects one or more different correction filters corresponding to noise perception amounts close to the target noise perception amount out of the correction filters acquired by the correction filter acquisition unit 1503. Detailed selection processing will be described later. A correction filter processing unit 1507 performs various kinds of correction filter processing for the digital image of the rectangular region $i_{m,n}$ obtained from the region segmentation unit 1502 using the correction filter selected by the correction filter selection unit 1504, and obtains digital images as many as the correction filters. The correction filter processing can be known filter processing, and filter convolution processing is performed for the digital image.

An image composition unit 1508 weights and adds the digital images obtained by the correction filter processing unit 1507 based on the noise perception amounts. Detailed weighting/addition processing will be described later. A region composition unit 1509 arranges the rectangular regions $i_{m,n}$ in the order of index, composites them, and outputs an output image $i_{out}$. The output image $i_{out}$ is output from a terminal 1510.

<Noise Perception Amount Derivation Unit 1506>

Figure 16:
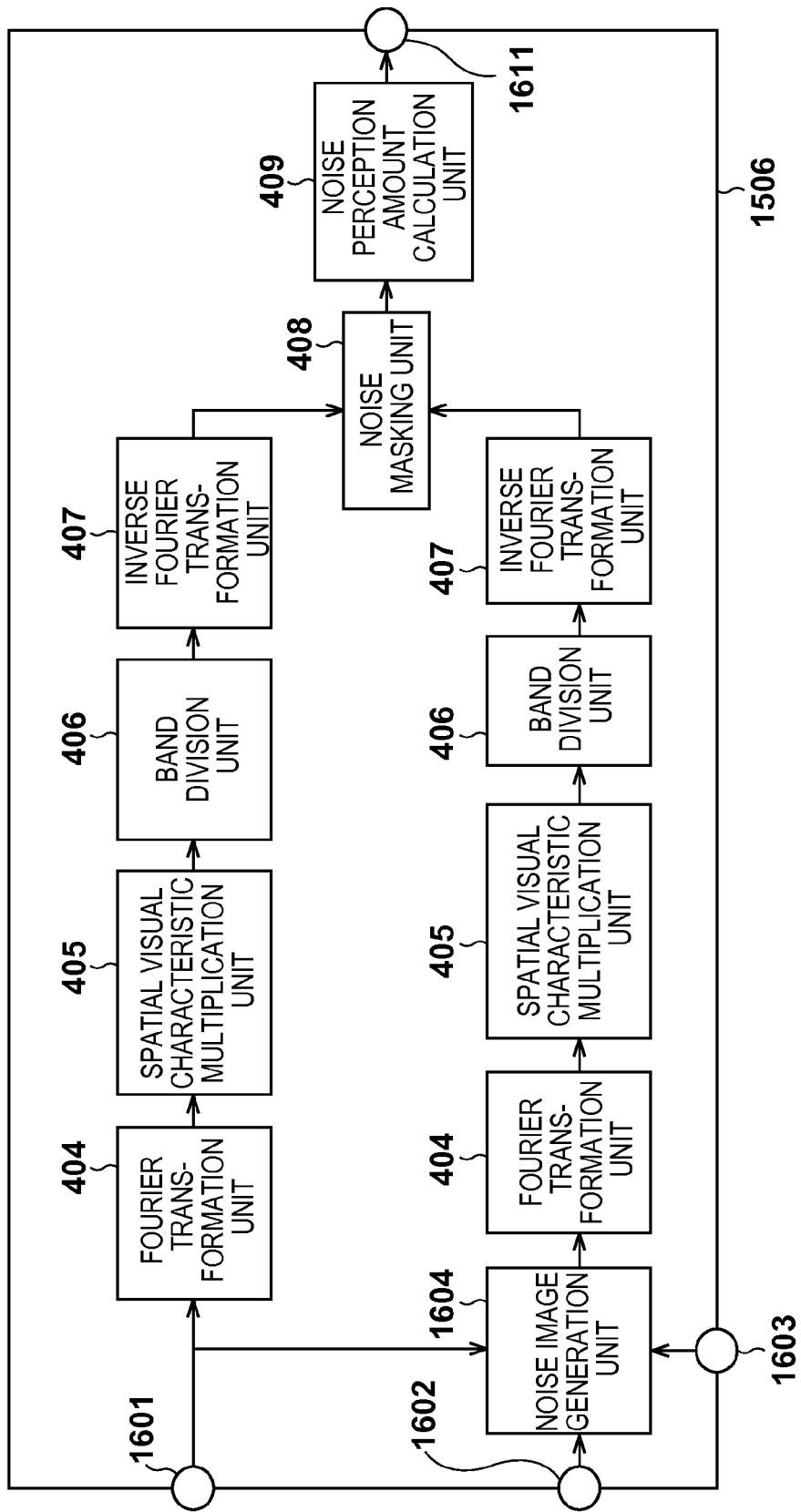
FIG. 16 is a block diagram showing the arrangement of a noise perception amount derivation unit according to the third embodiment.

FIG. 16 is a block diagram showing an example of the arrangement of the noise perception amount derivation unit 1506. The operation of the noise perception amount derivation unit 1506 will be described with reference to FIG. 16. The digital image $i_{in}(x, y)$ of the rectangular region $i_{m,n}$ corresponding to each index obtained by the region segmentation unit 1502 is input from a terminal 1601. The variance σn of noise obtained by the noise characteristic estimation unit 1505 is input from a terminal 1602. A correction filter $f(i, j)$ output from the correction filter selection unit 1504 is input from a terminal 1603.

A noise image generation unit 1604 generates a white noise image $n_w(x, y)$ in the same size as the digital image $i_{in}(x, y)$ of the rectangular region such that the variance of noise becomes σn. The noise image generation unit 1604 convolutes the correction filter $f(i, j)$ in the white noise image $n_w(x, y)$. Next, the noise image generation unit 1604 adds the digital image $i_{in}(x, y)$ to the white noise image $n_w(x, y)$ in which the correction filter $f(i, j)$ is convoluted, thereby generating a noise image $n(x, y)$. The noise image $n(x, y)$ is calculated by $$n(x, y) = i_{in}(x, y) + \sum_{i=I/2}^{I/2} \sum_{j=J/2}^{J/2} f(i, j) \cdot n_w(x-i, y-j) \quad (26)$$

where I and J are the maximum numbers of taps in the horizontal (lateral) and vertical (longitudinal) directions of the correction filter $f(i, j)$. A Fourier transformation unit 404 performs Fourier transformation for the digital image $i_{in}(x, y)$ of the rectangular region $i_{m,n}$. The spatial frequency information of the digital image $I_{in}(x, y)$ of the rectangular region (digital image $i_{in}(u, v)$ of the rectangular region after Fourier transformation) is thus generated. Another Fourier transformation unit 404 performs Fourier transformation for the noise image $n(x, y)$ of the rectangular region $i_{m,n}$. The spatial frequency information of the noise image $n(x, y)$ of the rectangular region $i_{m,n}$ (noise image $N(u, v)$ of the rectangular region $i_{m,n}$ after Fourier transformation) is thus generated.

Spatial visual characteristic multiplication units 405 multiply the digital image $I_{in}(u, v)$ of the rectangular region $i_{m,n}$ after Fourier transformation and the noise image $N(u, v)$ of the rectangular region after Fourier transformation by a spatial visual characteristic $VTF(u, v)$, respectively. Using a band division filter $cortex_{k,l}(u, v)$, a band division unit 406 performs band division of a digital image $IV(u, v)$ of the rectangular region $i_{m,n}$ which has undergone the Fourier transformation and the spatial visual characteristic multiplication. Band-divided frequency information $Is_{k,l}(u, v)$ of the rectangular region $i_{m,n}$ is thus generated. Using the band division filter $cortex_{k,l}(u, v)$, another band division unit 406 performs band division of a noise image $NV(u, v)$ of the rectangular region $i_{m,n}$ which has undergone the Fourier transformation and the spatial visual characteristic multiplication. Band-divided frequency information $Ns_{k,l}(u, v)$ of the rectangular region $i_{m,n}$ is thus generated.

Inverse Fourier transformation units 407 perform inverse Fourier transformation for the pieces of band-divided frequency information $Is_{k,l}(u, v)$ and $Ns_{k,l}(u, v)$ of the rectangular region $i_{m,n}$. A band-divided image $is_{k,l}(x, y)$ and a noise image $ns_{k,l}(x, y)$ which are divided into a plurality of spatial frequency bands are thus generated. A noise masking unit 408 performs masking for the band-divided image $ns_{k,l}(x, y)$ based on the band-divided image $is_{k,l}(x, y)$, thereby calculating a perceived noise image $P_{k,l}(x, y)$ for each spatial frequency band. A noise perception amount calculation unit 409 composites the perceived noise images $P_{k,l}(x, y)$ of the respective spatial frequency bands and calculates a noise perception amount $P(x, y)$. The noise perception amount $P(x, y)$ is output from a terminal 1611.

<Correction Filter Selection Unit 1504>

Figure 17:
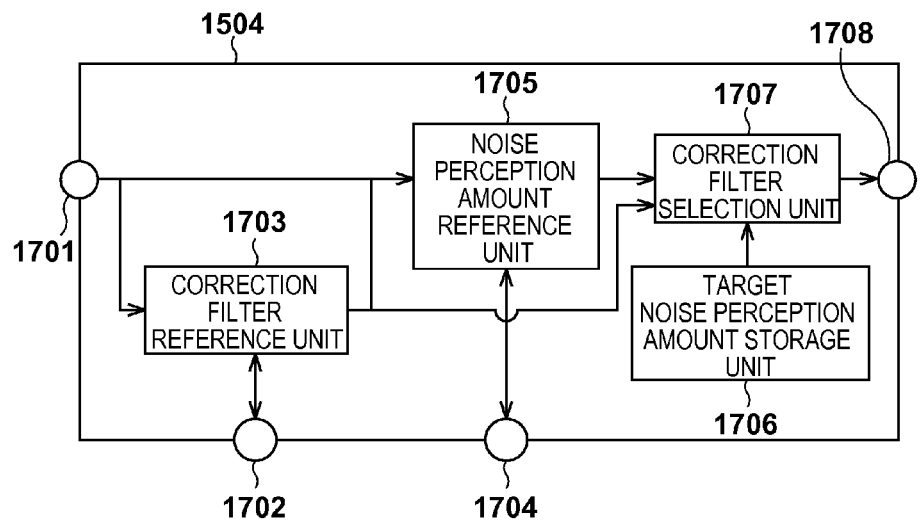
FIG. 17 is a block diagram showing the arrangement of a correction filter selection unit according to the third embodiment.

FIG. 17 is a block diagram showing an example of the arrangement of the correction filter selection unit 1504. An example of the operation of the correction filter selection unit 1504 will be described with reference to FIG. 17. A digital image $i_{m,j}(x, y)$ of the rectangular region $i_{m,n}$ corresponding to each index obtained by the region segmentation unit 1502 is input from a terminal 1701. The correction filter $f(i, j)$ acquired by the correction filter acquisition unit 1503 is input from a terminal 1702.

A correction filter reference unit 1703 acquires a plurality of correction filters $f(i, j)$ corresponding to the digital image $i_{m,j}(x, y)$ of the rectangular region $i_{m,n}$ from the correction filter acquisition unit 1503. The noise perception amount $P(x, y)$ corresponding to the digital image $i_{m,j}(x, y)$ of the rectangular region $i_{m,n}$ and the correction filter $f(i, j)$ corresponding to the rectangular region $i_{m,n}$ is input from a terminal 1704. A noise perception amount reference unit 1705 sequentially outputs the digital image $i_{m,j}(x, y)$ of the rectangular region $i_{m,n}$ and the correction filter $f(i, j)$ corresponding to the rectangular region $i_{m,n}$ to the noise perception amount derivation unit 1506 via the terminal 1704. The noise perception amount reference unit 1705 then acquires the noise perception amount $P(x, y)$ for each correction filter $f(i, j)$ from the noise perception amount derivation unit 1506 via the terminal 1704. For example, when there are three different correction filters $f(i, j)$, the noise perception amount reference unit 1705 acquires a first noise perception amount $P1(x, y)$, a second noise perception amount $P2(x, y)$, and a third noise perception amount $P3(x, y)$.

A target noise perception amount storage unit 1706 stores a target noise perception amount Pd that is the noise perception amount of the target of the image processing unit 1500 according to this embodiment. A correction filter selection unit 1707 selects a correction filter corresponding to one of the noise perception amounts obtained from the noise perception amount reference unit 1705 which is close to the target noise perception amount Pd. The correction filter selection is performed, for example, in the following way. First, the correction filter selection unit 1707 calculates an average value $avg_{pn}$ of each noise perception amount (at each position (x, y)) obtained from the noise perception amount reference unit 1705. In the above-described example, the average values $avg_{pn}$ of the first noise perception amount P1(x, y), the second noise perception amount P2(x, y), and the third noise perception amount P3(x, y) at the calculation target position (x, y) are calculated.

The correction filter selection unit 1707 compares the target noise perception amount Pd with the calculated average values $avg_{pn}$ of the noise perception amounts. If the target noise perception amount Pd is the smallest as the result of comparison, the correction filter selection unit 1707 selects a correction filter corresponding to the noise perception amount having the smallest average value $avg_{pn}$. If the target noise perception amount Pd is the largest, the correction filter selection unit 1707 selects a correction filter corresponding to the noise perception amount having the largest average value $avg_{pn}$. If the target noise perception amount Pd is neither the largest nor the smallest, the correction filter selection unit 1707 selects two different correction filters corresponding to the noise perception amounts having the average values $avg_{pn}$ close to the target noise perception amount Pd.

The correction filter selection unit 1707 outputs the selected correction filter, the target noise perception amount Pd, and the noise perception amount corresponding to the correction filter to the correction filter processing unit 1507 via a terminal 1708. When two different correction filters are selected by the correction filter selection unit 1707, the correction filter processing unit 1507 performs correction filter processing for the digital image $i_{m}(x, y)$ of each rectangular region $i_{m,n}$ using each correction filter. The digital images for which the correction filter processing unit 1507 has thus performed correction filter processing will be referred to as a first corrected digital image and a second corrected digital image hereinafter. The average values $avg_{pn}$ of the noise perception amounts corresponding to the first corrected digital image and the second corrected digital image will be referred to as $avg_{p1}$ and $avg_{p2}$, respectively.

<Image Composition Unit 1508>

Figure 18:
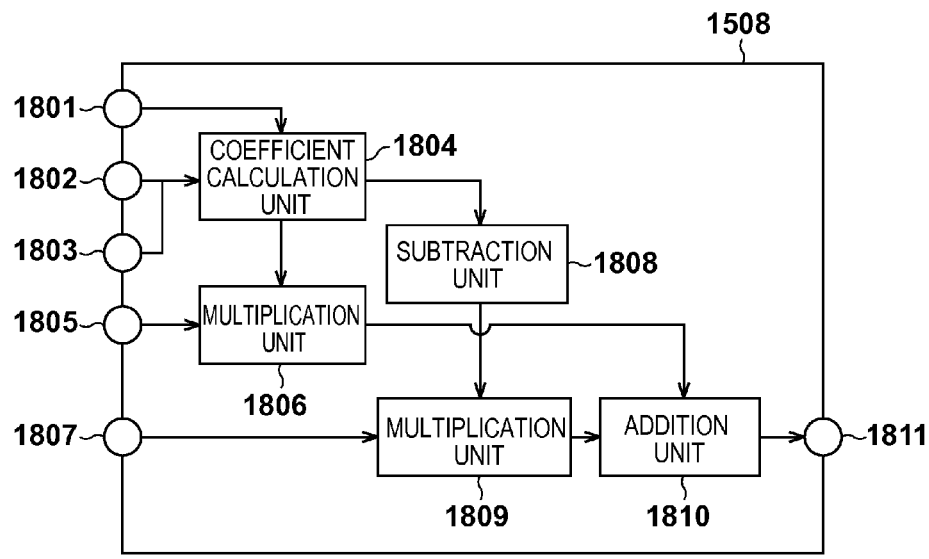
FIG. 18 is a block diagram showing the arrangement of an image composition unit according to the third embodiment.

FIG. 18 is a block diagram showing an example of the arrangement of the image composition unit 1508. An example of the operation of the image composition unit 1508 will be described with reference to FIG. 18. The target noise perception amount Pd is input from a terminal 1801. The average value $avg_{p1}$ of the noise perception amount corresponding to the first corrected digital image obtained by the correction filter processing unit 1507 is input from a terminal 1802. The average value $avg_{p2}$ of the noise perception amount corresponding to the second corrected digital image obtained by the correction filter processing unit 1507 is input from a terminal 1803. A coefficient calculation unit 1804 calculates a coefficient c1, based on the average values $avg_{p1}$ and $avg_{p2}$ of the noise perception amounts, by, $$c1 = \frac{avg_{p2} - pd}{avg_{p2} - avg_{p1}} \quad (27)$$

However, equation (27) exemplifies a case where conditions given by $$avg_{p2} > avg_{p1} \quad (28)$$

$$avg_{p1} < pd < avg_{p2} \quad (29)$$

hold.

The first corrected digital image obtained by the correction filter processing unit 1507 is input from a terminal 1805.

A multiplication unit 1806 multiplies the first corrected digital image input from the terminal 1805 by the coefficient c1. The second corrected digital image obtained by the correction filter processing unit 1507 is input from a terminal 1807. A subtraction unit 1808 calculates a coefficient c2 by $$c2 = 1 - c1 \quad (30)$$

A multiplication unit 1809 multiplies the second corrected digital image input from the terminal 1807 by the coefficient c2. An addition unit 1810 adds the first corrected digital image multiplied by the coefficient c1 and the second corrected digital image multiplied by the coefficient c2, and outputs the image to the region composition unit 1509 via a terminal 1811. Note that when the correction filter selection unit 1707 selects one correction filter, digital image composition by the image composition unit 1508 is not performed.

As described above, in this embodiment, a plurality of correction filter candidates are acquired for each rectangular region $i_{m,n}$, and the noise perception amount when using each correction filter is derived. A correction filter corresponding to one of the derived noise perception amounts, which is close to a target noise perception amount pd that is the target value of the noise perception amount, is selected. When a plurality of correction filters are selected, digital images that have undergone the correction filter processing by the plurality of correction filters are composited so as to make the noise perception amount closer to the target noise perception amount pd. Hence, the correction filter can be selected so as to make the noise perception amount closer to the target noise perception amount, in addition to the effects described in the first and second embodiments. It is therefore possible to make the noise perception amount of the digital image after blur correction close to the target noise perception amount. Note that in this embodiment, a case where a component configured to select a correction filter is added to the second embodiment has been exemplified. However, this embodiment may be applied to the first embodiment. In addition, when weighting/addition (calculation of a weighted linear sum) is performed using a large weight coefficient for the digital image corrected using the correction filter corresponding to the noise perception amount close to the target noise perception amount Pd, calculation of equation (27) need not always be performed.

Fourth Embodiment

The fourth embodiment will be described next. In the first to third embodiments, an example has been described in which a filter known as a cortex filter is used for the processing of the band division units 406 of the noise perception amount derivation units 203, 1204, and 1506. However, since the cortex filter has a frequency characteristic in a very special shape, the arithmetic processing is heavy. In this embodiment, the cortex filter is replaced with a simple band division filter formed by combining filters in the longitudinal and lateral directions of a spatial frequency domain, thereby lightening the arithmetic processing. As described above, this embodiment and the first to third embodiments are different mainly in the arrangement and processing based on the different band division filter. Hence, the same reference numerals as in FIGS. 1 to 18 of the first to third embodiments denote the same parts in this embodiment, and a detailed description thereof will be omitted.

<Noise Perception Amount Derivation Unit 1900>

Figure 19:
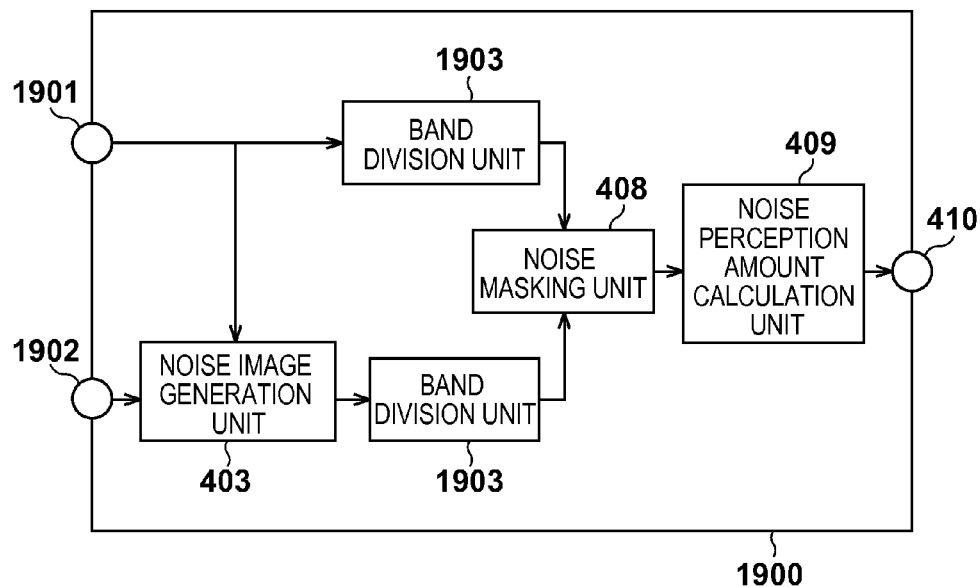
FIG. 19 is a block diagram showing the arrangement of a noise perception amount derivation unit according to the fourth embodiment.

FIG. 19 is a block diagram showing an example of the arrangement of a noise perception amount derivation unit 1900. An example of the operation of the noise perception amount derivation unit 1900 according to this embodiment will be described with reference to FIG. 19. This embodiment and the first embodiment are different in the arrangement of the noise perception amount derivation unit. A digital image $i_{in}(x, y)$ generated by a signal processing unit 103 is input from a terminal 1901. A variance σn of noise (noise characteristic) obtained by a noise characteristic estimation unit 202 is input from a terminal 1902.

Figure 20:
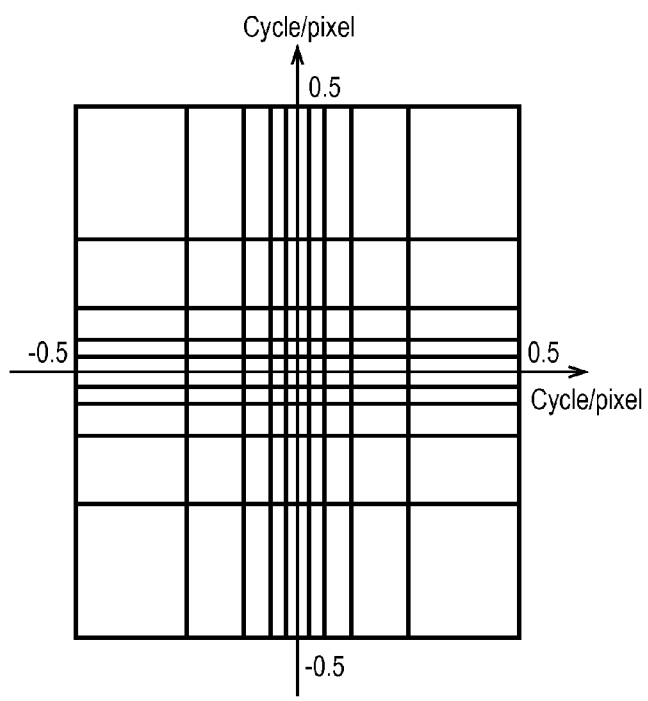
FIG. 20 is a view showing an example of a band-divided spatial frequency domain according to the fourth embodiment.

A noise image generation unit 403 generates a white noise image $n_w(x, y)$ in the same size as the digital image $i_{in}(x, y)$ such that the variance of noise becomes the variance σn of noise input from the terminal 1902. The noise image generation unit 403 generates a noise image $n(x, y)$ by adding the digital image $i_{in}(x, y)$ and the white noise image $n_w(x, y)$. A band division unit 1903 divides the digital image $i_{in}(x, y)$ into a plurality of spatial frequency bands using a band division filter, and generates band-divided frequency information $Is_{k,l}(u, v)$ for the digital image. Similarly, the band division unit 1903 divides the noise image $n(x, y)$ into a plurality of spatial frequency bands using the band division filter, and generates band-divided frequency information $Ns_{k,l}(u, v)$ for the noise image. The pieces of band-divided frequency information $Is_{k,l}(u, v)$ and $Ns_{k,l}(u, v)$ can be obtained by $$Is_{k,l}(u,v) = Iv(u,v) \cdot \text{filtebank}_{k,l}(u,v) \quad (31)$$

$$Ns_{k,l}(u,v) = Nv(u,v) \cdot \text{filtebank}_{k,l}(u,v) \quad (32)$$

where k is the index in the horizontal (lateral) direction, and l is the index in the vertical (longitudinal) direction. In equations (31) and (32), a band division filter $\text{filterbank}_{k,l}(u, v)$ is defined by $$\text{filterbank}_{k,l}(u, v) = \begin{cases} dom_k(u) \cdot dom_l(v) & \text{for } k = 1, K-1; l = 1, L-1 \\ \text{base}(u) \cdot dom_l(v) & \text{for } k = K; l = 1, L-1 \\ dom_k(u) \cdot \text{base}(v) & \text{for } k = 1, K-1; l = L \\ \text{base}(u) \cdot \text{base}(v) & \text{for } k = K; l = L \end{cases} \quad (33)$$

where K is the division number of the spatial frequency band in the horizontal (lateral) direction, and L is the division number of the spatial frequency band in the vertical (longitudinal) direction. In this embodiment, K=6, and L=6. FIG. 20 is a view schematically showing a spatial frequency domain divided by the band division filter $\text{filterbank}_{k,l}(u, v)$ into a plurality of domains. Referring to FIG. 20, both the abscissa and the ordinate represent the normalized frequency space. In FIG. 20, the half frequency of each filter is indicated by a thick solid line. A noise masking unit 408 performs masking for the band-divided frequency information $Ns_{k,l}(u, v)$ of the noise image based on the band-divided frequency information $Is_{k,l}(u, v)$ of the digital image. A perceived noise image $P_{k,l}(x, y)$ that is a noise image to be perceived by human is thus calculated. The perceived noise image $P_{k,l}(x, y)$ is calculated for each spatial frequency band. A noise perception amount calculation unit 409 composites the perceived noise images $P_{k,l}(x, y)$ of the respective spatial frequency bands and calculates a noise perception amount $P(x, y)$.

As described above, in this embodiment, it is possible to implement image processing for correcting the lens aberration while suppressing noise by simple processing without using a special filter such as a cortex filter. Note that in this embodiment, the band division is performed by multiplication in the frequency domain. However, the band division can also be implemented by convolution in the space domain. A known band division filter such as wavelet is applicable to this embodiment. In this embodiment, a case where the band division filter according to the first embodiment is modified has been exemplified. However, this embodiment is also applicable to the second and third embodiments.

Fifth Embodiment

In the fifth to ninth embodiments below, super resolution processing is used. More specifically, two super resolution processes are performed for an input low resolution image, and output images after the super resolution processes are composited so as to increase the sense of resolution while suppressing noise. At this time, the mixing ratio of the two super resolution output images is decided based on a noise map that maps noise perceptibility according to the image structure of the input image. This makes it possible to assign super resolution processing with little noise to a region where noise is readily perceived and super resolution processing with a high sense of resolution to a region where noise is hardly perceived. Hence, super resolution that simultaneously implements a sense of noise and sharpness can be performed. Note that the literature 1 includes a detailed description of a noise sensitivity model, as described above. The arrangement of an image processing apparatus according to this embodiment is the same as in FIG. 1.

<Image Processing Unit 104>

Figure 21:
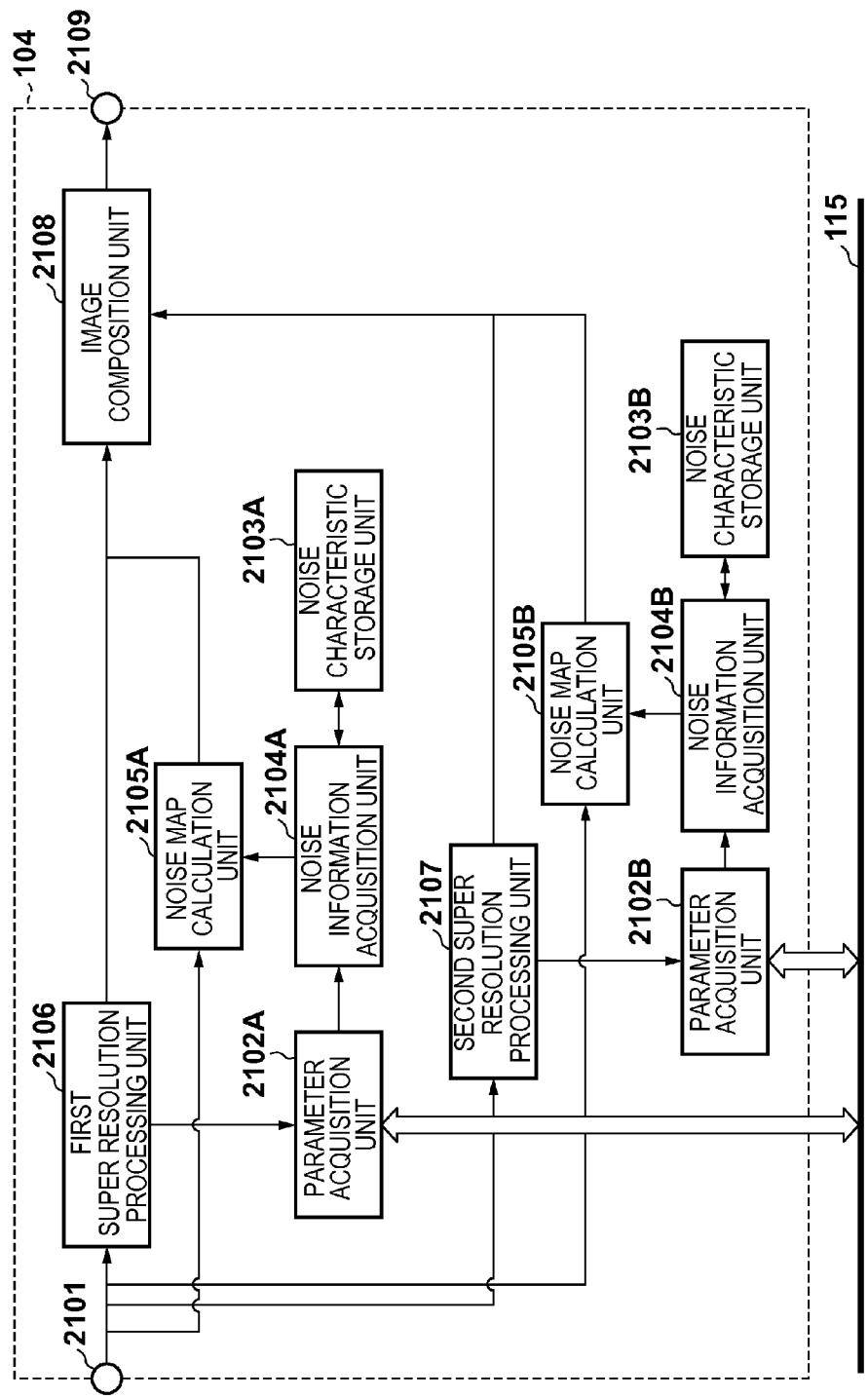
FIG. 21 is a block diagram showing the arrangement of an image processing unit according to the fifth embodiment.

FIG. 21 is a block diagram showing the arrangement of an image processing unit 104 according to the fifth embodiment. A digital image signal generated by a signal processing unit 103 is input from a terminal 2101. Parameter acquisition units 2102A and 2102B acquire processing setting parameters designated by a first super resolution processing unit 2106 and a second super resolution processing unit 2107, respectively, from a RAM 110 via a system bus 115. Noise characteristic storage units 2103A and 2103B store noise characteristics according to the processing setting parameters of the first super resolution processing unit 2106 and the second super resolution processing unit 2107, respectively, while associating them using a table or relational expression. Note that the noise characteristic of this embodiment includes a noise amount and an autocorrelation function. Noise information acquisition units 2104A and 2104B acquire the noise characteristics from the noise characteristic storage units 2103A and 2103B, respectively, based on the processing setting parameters acquired from the parameter acquisition units 2102A and 2102B, respectively.

The noise information acquisition units 2104A and 2104B transmit the acquired noise characteristics to noise map calculation units 2105A and 2105B, respectively, as noise information included in the image. The noise map calculation units 2105A and 2105B generate noise maps expressing noise perceptibility in the image based on the noise characteristics acquired by the noise information acquisition units 2104A and 2104B, respectively, as the noise information and the digital image input from the signal processing unit 103. Each of the first super resolution processing unit 2106 and the second super resolution processing unit 2107 performs resolution conversion processing for the digital image obtained from the signal processing unit 103 via the system bus 115. An image composition unit 2108 calculates an addition ratio based on the images obtained by the first super resolution processing unit 2106 and the second super resolution processing unit 2107, composites the images according to the calculated addition ratio, and outputs one high resolution image. The digital image that has undergone the super resolution processing is output from a terminal 2109. Note that the units 2102A to 2105A in FIG. 21 may be confirmed as the same blocks as the units 2102B to 2105B, respectively. In this case, processes corresponding to the first super resolution processing unit 2106 and the second super resolution processing unit 2107 are performed parallelly or selectively.

<Noise Map Calculation Units 2105A and 2105B>

Figure 22:
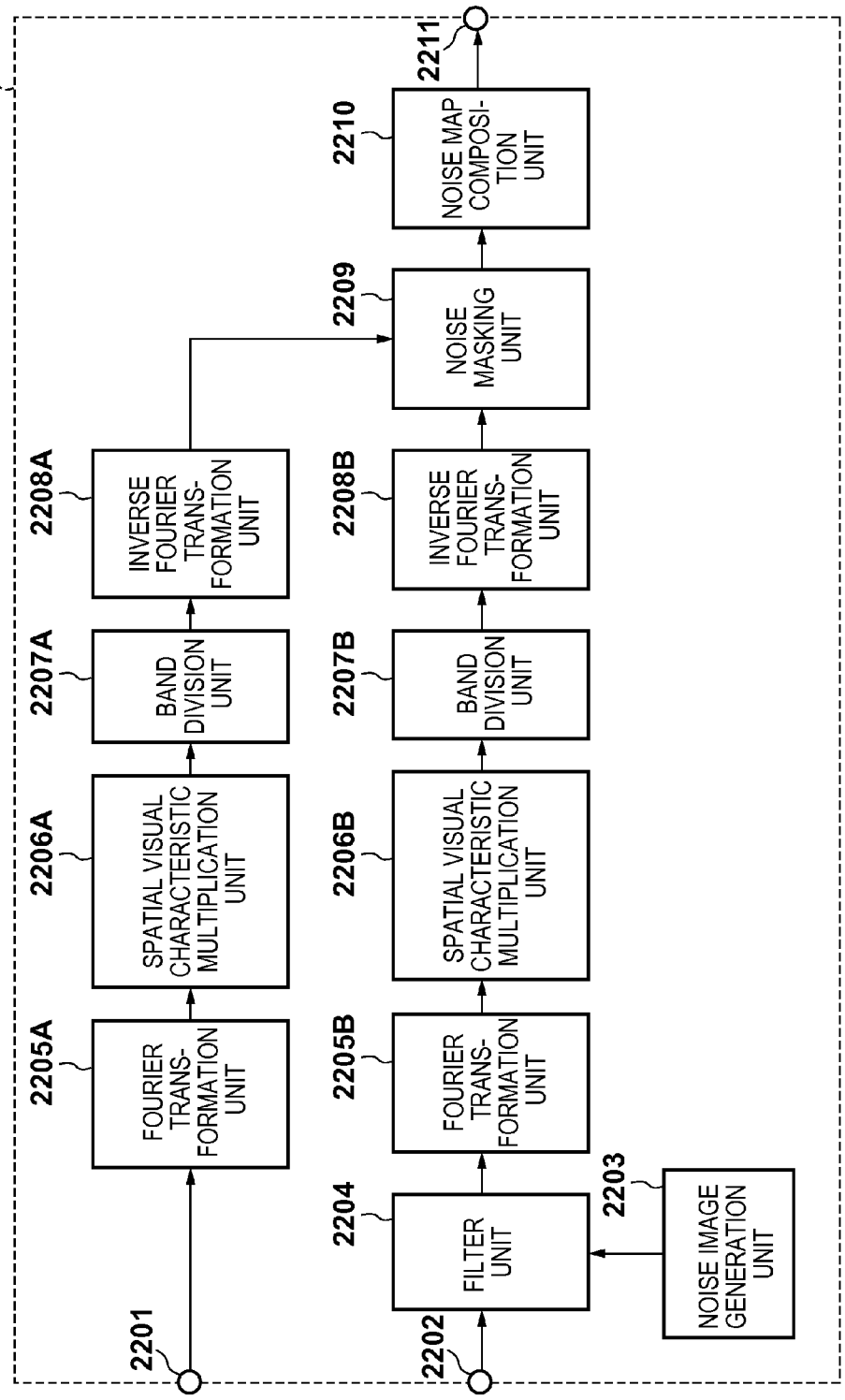
FIG. 22 is a block diagram showing the arrangement of a noise map calculation unit according to the fifth embodiment.

FIG. 22 is a block diagram showing the arrangement of the noise map calculation unit 2105A according to this embodiment. Note that the noise map calculation unit 2105B has the same arrangement as the noise map calculation unit 2105A. A digital image generated by the signal processing unit 103 is input to a terminal 2201. This digital image will be referred to as $i_{in}(x, y)$. The noise information from the noise information acquisition unit 2104A is input to a terminal 2202. A noise image generation unit 2203 generates a white noise image $n_w(x, y)$ at the same position as the digital image so as to obtain a predetermined power. A filter unit 2204 estimates a noise image $n(x, y)$ of the camera by performing, for the white noise image $n_w(x, y)$, an operation represented by $$n(x,y) = \alpha \cdot n_w(x,y) \cdot c(x,y) \tag{33}$$

where α is a correction term concerning the noise amount acquired by the noise information acquisition unit 2104A. In addition, $c(x, y)$ is obtained such that the Fourier transformation result of the autocorrelation function of the noise acquired by the noise information acquisition unit 2104A matches the power spectrum of $c(x, y)$.

Processing from Fourier transformation units 2205A and 2205B to a noise masking unit 2209 is the same as that from the Fourier transformation units 404 to the noise masking unit 408 in FIG. 4, and a description thereof will be omitted.

A noise map composition unit 2210 calculates a noise map NM1(x, y) by compositing, through all the bands, perceived noise images $P_{k,l}(x, y)$ of the respective bands based on $$NM1(x, y) = \sum_{k}^{K} \sum_{l}^{L} P_{k,l}(x, y) \tag{34}$$

Note that the noise map calculation unit 2105B calculates a noise map NM2(x, y) in accordance with the same procedure as the above-described processing.

<Image Composition Unit 2108>

FIG. 23 is a block diagram showing the arrangement of the image composition unit 2108 according to this embodiment. A digital image $i_{in1}(x, y)$ after the first super resolution processing is input from the first super resolution processing unit 2106 to a terminal 2301. A digital image $i_{in2}(x, y)$ after the second super resolution processing is input from the second super resolution processing unit 2107 to a terminal 2302. The noise map NM1(x, y) for the first super resolution processing calculated by the noise map calculation unit 2105A is input to a terminal 2303. The noise map NM2(x, y) for the second super resolution processing calculated by the noise map calculation unit 2105B is input to a terminal 2304.

A weight decision unit 2305 generates weight maps W1(x, y) and W2(x, y) representing the mixed weights of two pixel values of $i_{in1}(x, y)$ and $i_{in2}(x, y)$ according to the image position (x, y) based on the pieces of noise map information NM1(x, y) and NM2(x, y). The weight maps W1(x, y) and W2(x, y) can respectively be calculated by, for example, $$W_1(x, y) = \begin{cases} 1 & (NM_1(x, y) \le NM_2(x, y)) \\ 0 & (NM_1(x, y) > NM_2(x, y)) \end{cases} \tag{35}$$

$$W_2(x, y) = 1 - W_1(x, y) \tag{36}$$

In this embodiment, however, the calculation method is not limited to this.

An image addition unit 2306 performs composition processing of the digital images $i_{in1}(x, y)$ and $i_{in2}(x, y)$, as will be described later, in accordance with the weight maps W1(x, y) and W2(x, y).

<Arrangement of Image Addition Unit 2306>

FIG. 24 is a block diagram showing the arrangement of the image addition unit 2306 according to this embodiment. The image addition unit 2306 performs weighting/addition processing of the digital images $i_{in1}(x, y)$ and $i_{in2}(x, y)$ using the weight maps W1(x, y) and W2(x, y) calculated by the weight decision unit 2305. The digital image $i_{in1}(x, y)$ is input to a terminal 2401, and the digital image $i_{in2}(x, y)$ is input to a terminal 2402. The weight map W1(x, y) for the digital image $i_{in1}(x, y)$ is input to a terminal 2406, and the weight map W2(x, y) for the digital image $i_{in2}(x, y)$ is input to a terminal 2407. Coefficient setting units 2408A and 2408B set coefficients according to coordinates for multiplication units 2403A and 2403B by referring to the weight maps W1(x, y) and W2(x, y), respectively. The multipliers 2403A and 2403B read out pixel values from the input digital image and multiply them by the preset coefficients. An adder 2404 adds the pixel values multiplied by the weights.

As described above, according to this embodiment, two noise maps expressing the noise perceptibility are calculated, and two super resolution results are weighted and added based on the maps. Hence, super resolution processing capable of obtaining the sharpness improving effect can be implemented while suppressing the adverse effect of noise degradation. Note that in this embodiment, a case where two super resolution processes are composited has been described. However, the present invention is not limited to this. Even when three or more super resolution processes are performed, super resolution processing capable of obtaining the sharpness improving effect can be implemented while suppressing the adverse effect of noise degradation by calculating the noise maps for the processes and compositing them.

Sixth Embodiment

In the fifth embodiment, noise maps are calculated for two super resolution processes, respectively, and weights are decided from the two noise maps. In this method, the calculation amount and the circuit scale become large, although the region where noise is perceived can accurately be determined. In this embodiment, processing is simplified to decide the weight from one noise map. The difference from the first embodiment will be described below.

<Image Processing Unit 104>

Figure 25:
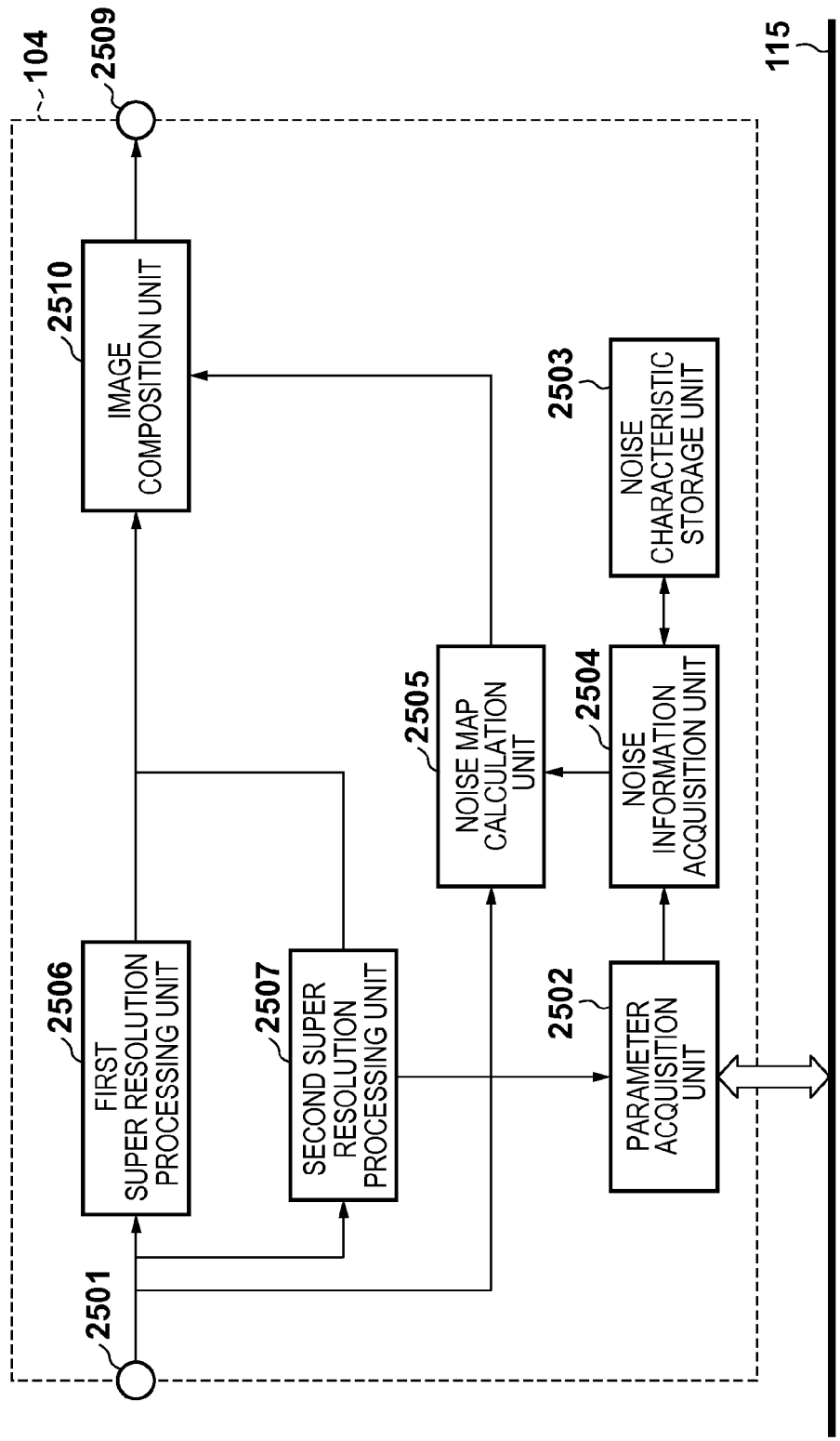
FIG. 25 is a block diagram showing the arrangement of an image processing unit according to the sixth embodiment.

FIG. 25 is a block diagram showing the arrangement of an image processing unit 104 according to this embodiment. The arrangements of a parameter acquisition unit 2502, a noise characteristic storage unit 2503, a noise information acquisition unit 2504, and a noise map calculation unit 2505 are the same as those of the units 2102B to 2105B in FIG. 21, respectively. That is, the noise map calculation unit 2505 calculates a noise map NM2(x, y) based on the setting parameters of second super resolution processing but not a noise map NM1(x, y) based on the setting parameters of first super resolution processing. An image composition unit 2510 calculates an addition ratio based on an image obtained by a second super resolution processing unit 207, composites the images according to the calculated addition ratio, and outputs one high resolution image.

<Image Composition Unit 2510>

Figure 26:
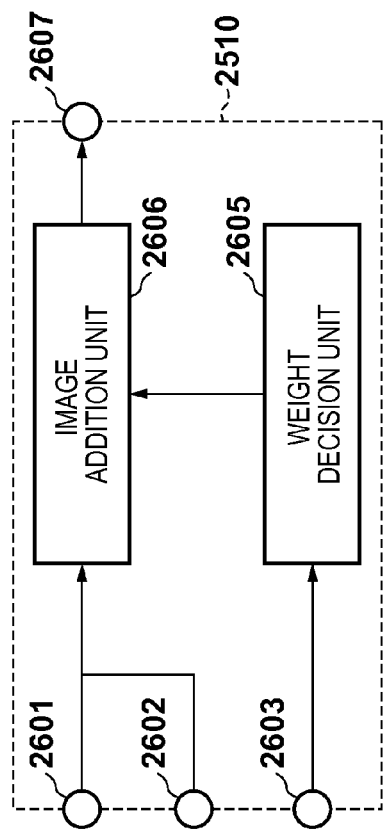
FIG. 26 is a block diagram showing the arrangement of an image composition unit according to the sixth embodiment.

FIG. 26 is a block diagram showing the arrangement of the image composition unit 2510 according to this embodiment. A digital image $i_{in1}$(x, y) after the first super resolution processing is input from a first super resolution processing unit 2506 to a terminal 2601. A digital image $i_{in2}$(x, y) after the second super resolution processing is input from the second super resolution processing unit 2507 to a terminal 2602. The noise map NM2(x, y) for the second super resolution processing calculated by the noise map calculation unit 2505 is input to a terminal 2603. A weight decision unit 2605 generates weight maps W1(x, y) and W2(x, y) representing the mixed weights of two pixel values of $i_{in1}$(x, y) and $i_{in2}$(x, y) according to the image position (x, y) based on the noise map NM2(x, y) and a predetermined threshold th. The weight maps W1(x, y) and W2(x, y) can respectively be calculated by, for example, $$W_2(x, y) = \begin{cases} 1 & (NM_2(x, y) \le th) \\ 0 & (NM_2(x, y) > th) \end{cases} \quad (37)$$

$$W_1(x, y) = 1 - W_2(x, y) \quad (38)$$

However, the present invention is not limited to these calculation methods.

An image addition unit 2606 performs composition processing of the digital images $i_{in1}$(x, y) and $i_{in2}$(x, y) in accordance with the weight maps.

As described above, according to this embodiment, one noise map is calculated for two super resolution processes, and two super resolution results are weighted and added based on this map. It is therefore possible to obtain the same effects as in the fifth embodiment while reducing the calculation amount and the circuit scale as compared to the fifth embodiment. Note that in this embodiment, an example in which the weight maps are calculated based on the noise map NM2(x, y) has been described. However, the weight maps may be calculated based on the noise map NM1(x, y) based on the setting parameters of the first super resolution processing.

Seventh Embodiment

In the fifth embodiment, the noise map calculation units 2105A and 2105B generate the band-divided image $ns_{k,l}$(x, y) of noise from the actually generated noise image n(x, y). In this method, however, the noise image n(x, y) needs to be calculated, and the calculation amount is large. In this embodiment, a band-divided image $ns_{k,l}$(x, y) of noise is directly generated based on information about a noise characteristic, thereby simplifying processing. A noise map calculation unit 2111A changed from the noise map calculation unit 2105A according to the fifth embodiment will be described below. Note that a noise map calculation unit 2111B changed from the noise map calculation unit 2105B has the same arrangement as the noise map calculation unit 2111A.

<Noise Map Calculation Unit 2111A>

Figure 27:
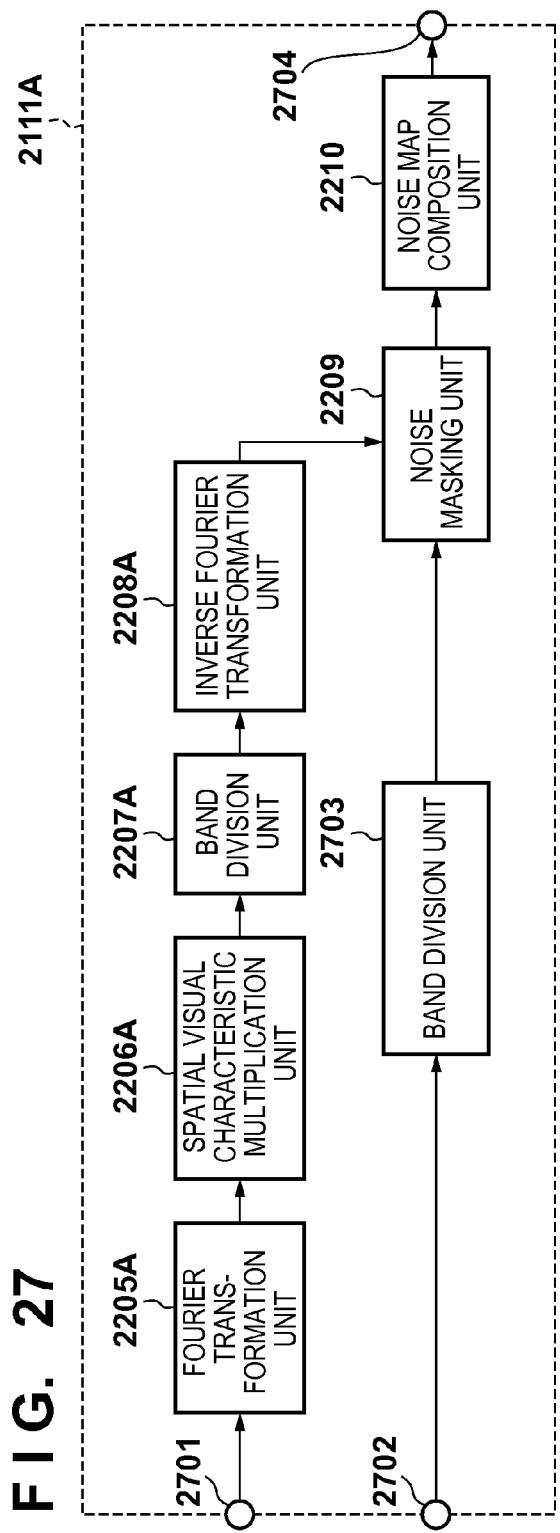
FIG. 27 is a block diagram showing the arrangement of a noise map calculation unit according to the seventh embodiment.

FIG. 27 is a block diagram showing the arrangement of the noise map calculation unit 2111A according to this embodiment. A digital image $i_{in}$(x, y) is input from a signal processing unit 103 to a terminal 2701. Noise information is input from a noise information acquisition unit 2104A to a terminal 2702. Processing from a Fourier transformation unit 2205A to an inverse Fourier transformation unit 2208A is the same as in FIG. 22, and a description thereof will be omitted.

A band division unit 2703 generates the band-divided image $ns_{k,l}$(x, y) based on the information about a noise characteristic acquired by the noise information acquisition unit 2104A. First, the band division unit 2703 Fourier-transforms the autocorrelation function of noise acquired by the noise information acquisition unit 2104A, and calculates a power spectrum C(u, v) of noise. Based on C(u, v), a power spectrum $NPS_{k,l}$(u, v) of noise for each band is calculated by $$NPS_{k,l}(u,v) = \alpha^2 C(u,v) \cdot \text{cortex}^2_{k,l}(u,v) \quad (39)$$

where k is the index in the radial direction, and l is the index in the circumferential direction. α is a correction term concerning the noise amount acquired by the noise information acquisition unit 2104A, and $\text{cortex}_{k,l}$(u, v) is the band division filter described in the first embodiment. In addition, the sum of $NPS_{k,l}$(u, v) is calculated, and a power $NP_{k,l}$ for each band is calculated by $$NP_{k,l} = \frac{1}{UV} \sum_u \sum_v NPS_{k,l}(u, v) \quad (40)$$

where U is the frequency division number in the lateral direction, and V is the frequency division number in the longitudinal direction. From the power for each band, the band-divided image $ns_{k,l}$(x, y) is generated as a uniform solid image by $$ns_{k,l}(x,y) = (NP_{k,l})^{0.5} \quad (41)$$

A noise masking unit 2209 performs masking for the band-divided noise image $ns_{k,l}$(x, y) based on a band-divided image $is_{k,l}$(x, y) output from the inverse Fourier transformation unit 2208A, and calculates a perceived noise image $P_{k,l}$(x, y) for each band. A noise map composition unit 2210 calculates a noise map NM1(x, y) by compositing the perceived noise images $P_{k,l}$(x, y) of the respective bands. Processing after the noise map composition unit 2210 is the same as that described in the fifth embodiment, and a description thereof will be omitted.

As described above, according to this embodiment, the band-divided image $ns_{k,l}$(x, y) of noise is directly generated without calculating the noise image n(x, y). It is therefore possible to obtain the same effects as in the fifth embodiment while reducing the calculation amount and the circuit scale as compared to the fifth embodiment.

Eighth Embodiment

In the fifth embodiment, a noise amount and an autocorrelation function are used as the noise information to be acquired by the noise information acquisition units 2104A and 2104B. However, this information is merely statistical information and is different from actually included noise. In this embodiment, a noise image calculated from an actual digital image is used as noise information. Portions changed from the fifth embodiment will be described below.

<Image Processing Unit 104>

FIG. 28 is a block diagram showing the arrangement of an image processing unit 104 according to this embodiment. A digital image processed by a signal processing unit 103 is input to a terminal 2801. Noise information acquisition units 2802A and 2802B compare the digital image output from the signal processing unit 103 with digital images output from a first super resolution processing unit 2106 and a second super resolution processing unit 2107, respectively, and calculate noise images. Noise map calculation units 2803A and 2803B generate noise maps expressing noise perceptibility in the image based on the noise images acquired by the noise information acquisition units 2802A and 2802B as the noise information and the digital image from the signal processing unit 103. An image composition unit 2108 composites the images obtained by the first super resolution processing unit 2106 and the second super resolution processing unit 2107, and outputs one high resolution image. A terminal 2804 outputs the digital image that has undergone the super resolution processing.

<Noise Information Acquisition Unit 2802A>

Figure 29:
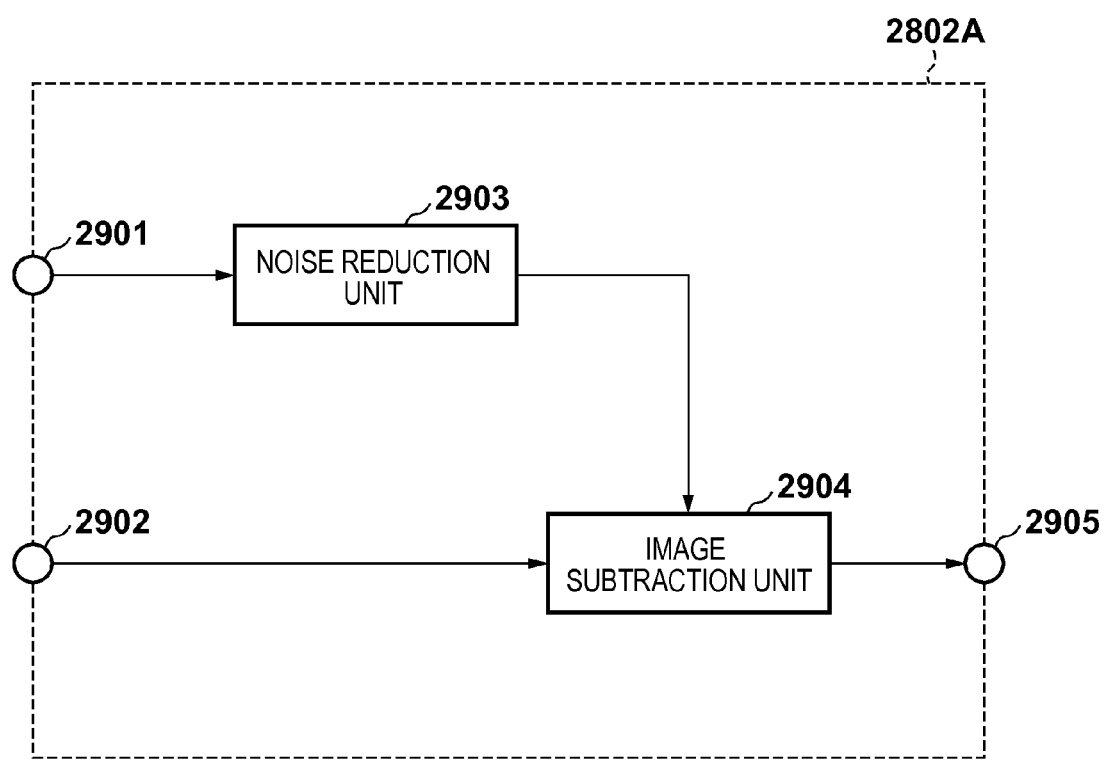
FIG. 29 is a block diagram showing the arrangement of a noise information acquisition unit according to the eighth embodiment.

FIG. 29 is a block diagram showing the arrangement of the noise information acquisition unit 2802A according to this embodiment. Note that the noise information acquisition unit 2802B has the same arrangement as the noise information acquisition unit 2802A. A digital image from the signal processing unit 103 is input to a terminal 2901 and a terminal 2902. A noise reduction unit 2903 performs high-frequency removal processing for the digital image, and generates a noise-removed image from which noise is removed. An image subtraction unit 2904 subtracts the noise-removed image output from the noise reduction unit 2903 from the digital image output from the signal processing unit 103, thereby calculating a noise image. A terminal 2905 outputs the noise image.

<Noise Map Calculation Unit 2803A>

Figure 30:
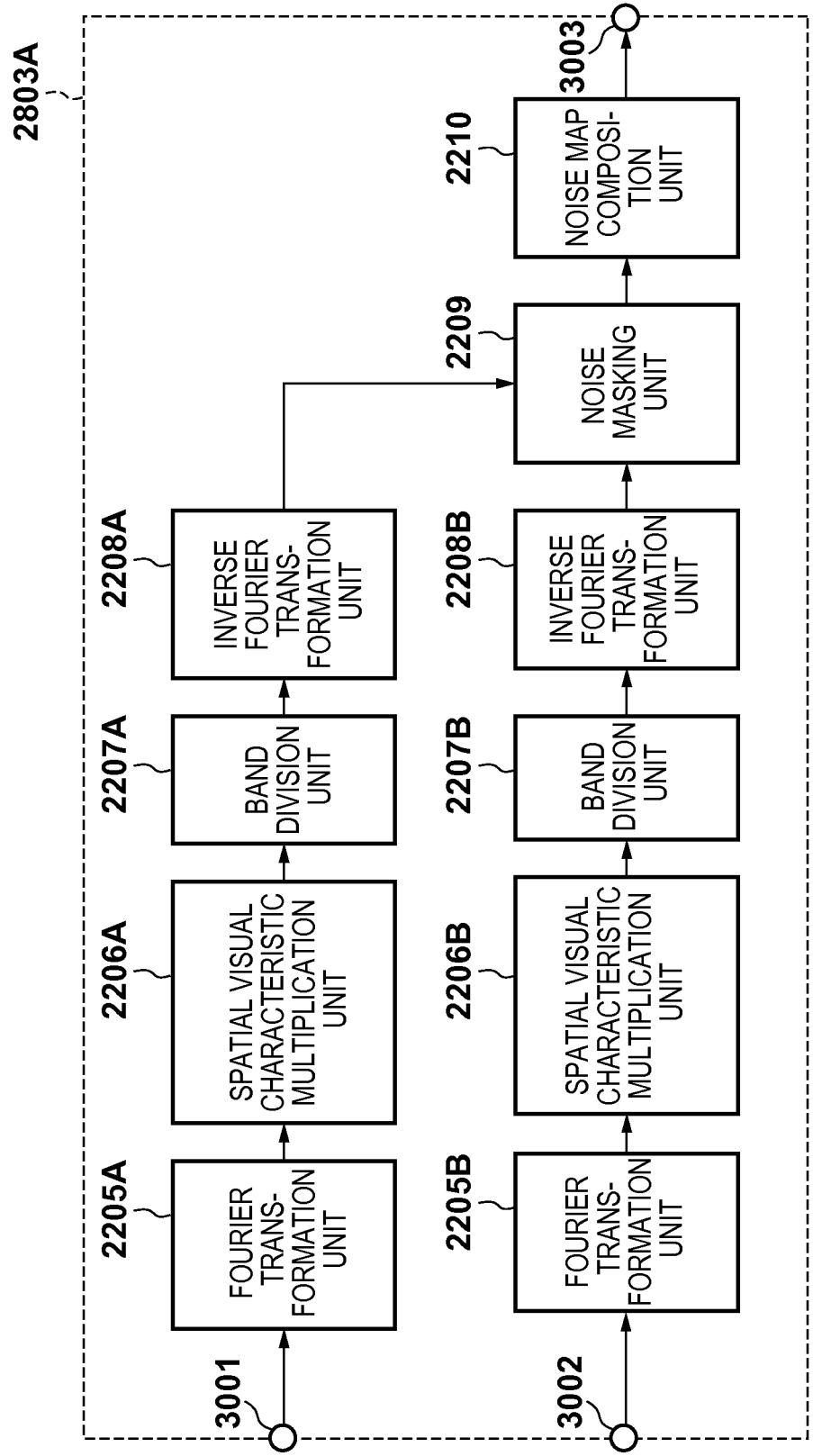
FIG. 30 is a block diagram showing the arrangement of a noise map calculation unit according to the eighth embodiment.

FIG. 30 is a block diagram showing the arrangement of the noise map calculation unit 2803A according to this embodiment. Note that the noise map calculation unit 2803B has the same arrangement as the noise map calculation unit 2803A. A digital image $i_{in}(x, y)$ is input from the signal processing unit 103 to a terminal 3001. A noise image n(x, y) is input from the noise information acquisition unit 2802 to a terminal 3002 as the noise information. The noise image n(x, y) is directly input from the terminal 3002 to a Fourier transformation unit 2205B, unlike the first embodiment. Processing from the Fourier transformation units 2205A and 2205B is the same as that described in the fifth embodiment, and a description thereof will be omitted.

As described above, according to this embodiment, the noise image calculated from the actual digital image is used as the noise information. It is therefore possible to obtain the same effects as in the fifth embodiment while reducing the calculation amount and the circuit scale as compared to the first embodiment in which the noise information is calculated.

Ninth Embodiment

In the fifth embodiment, a filter known as a cortex filter is used for the processing of the band division units 2207A and 2207B of the noise map calculation units 2105A and 2105B. According to this method, however, since the filter has a frequency characteristic in a very special shape, the arithmetic processing is heavy. In this embodiment, the cortex filter according to the fifth embodiment is replaced with a simple band division filter formed by combining normal filters in the longitudinal and lateral directions, thereby lightening the arithmetic processing. A noise map calculation unit 2112A changed from the noise map calculation unit 2105A according to the fifth embodiment will be described below. Note that a noise map calculation unit 2112B changed from the noise map calculation unit 2105B has the same arrangement as the noise map calculation unit 2112A.

<Arrangement of Noise Map Calculation Unit 2112A>

Figure 31:
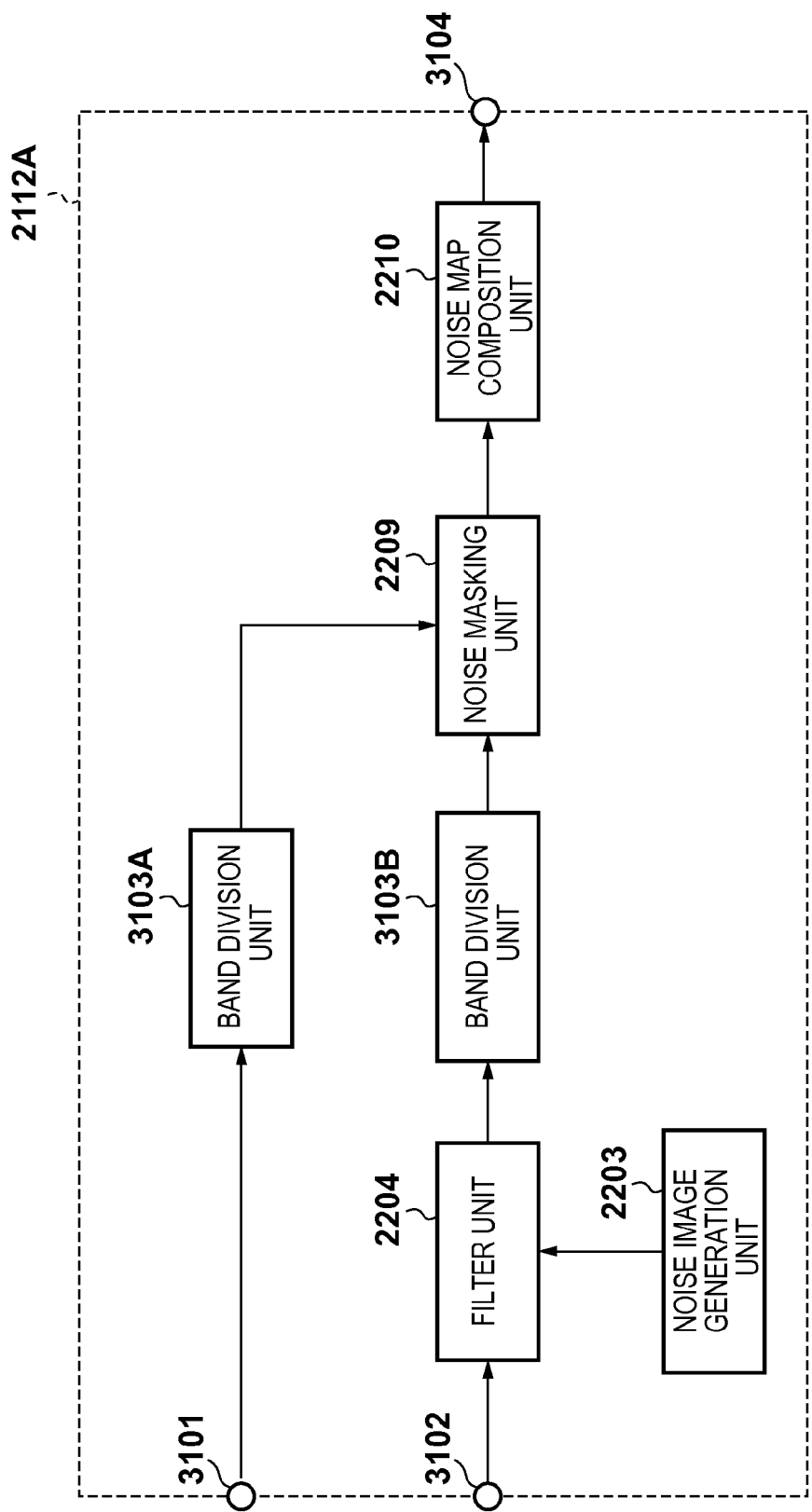
FIG. 31 is a block diagram showing the arrangement of a noise map calculation unit according to the ninth embodiment.

FIG. 31 is a block diagram showing the arrangement of the noise map calculation unit 2112A according to this embodiment. A digital image $i_{in}(x, y)$ is input from a signal processing unit 103 to a terminal 3101. Noise information is input from a noise information acquisition unit 2104A to a terminal 3102. A noise image generation unit 2203A and a filter unit 2204 estimate a noise image n(x, y) of the camera in accordance with the same procedure as the processing described in the fifth embodiment.

$$n(x,y)=\alpha \cdot n_w(x,y) \cdot c(x,y) \qquad (42)$$

Processing from a band division unit 3103 to a noise masking unit 2209 is the same as that from the band division unit 1903 to the noise masking unit 408 in FIG. 19, and a description thereof will be omitted. Processing from a noise map composition unit 310 is the same as that described in the fifth embodiment, and a description thereof will be omitted.

As described above, according to this embodiment, band division processing is performed using a simple band division filter formed by combining filters in the longitudinal and lateral directions. It is therefore possible to obtain the same effects as in the fifth embodiment while reducing the calculation amount and the circuit scale as compared to the fifth embodiment in which the cortex filter is used. Note that in this embodiment, the band division is performed by multiplication in the frequency domain. However, the band division can also be implemented by convolution in the space domain. In addition, a known band division filter such as wavelet is applicable to this embodiment.

Note that in the fifth to ninth embodiments, a plurality of super resolution images are composited based on the weight maps calculated from the noise maps. However, the present invention is not limited to this, and the processing of the image composition unit may be changed to, for example, processing to be described below.

In the fifth embodiment, the weight maps are directly calculated from the noise maps. In this method, however, the weight fluctuation between adjacent pixels is large, and noise is caused according to the image composition. To prevent this, the weight maps may be calculated after applying a low-pass filter to the noise maps, thereby suppressing the weight fluctuation between the adjacent pixels.

More specifically, the weight maps W1 and W2 in the fifth embodiment may be defined as $$W_1(x, y) = \begin{cases} 1 & ((NM_2(x, y) - NM_1(x, y)) * L \geq 0) \\ 0 & ((NM_2(x, y) - NM_1(x, y)) * L < 0) \end{cases} \quad (43)$$

$$W_2(x, y) = 1 - W_1(x, y) \quad (44)$$

where L indicates a low-pass filter, and * indicates convolution.

In the above-described embodiments, the weight maps are calculated for each pixel based on the noise maps. In these methods, however, the weight calculation and composition processing need enormous calculation amounts. To prevent this, the image may be segmented into regions, and a composition weight may be decided for each region. For example, a super resolution image having a small average value of a noise map may be selected for each of 16×16 or 32×32 regions, and the images may be integrated. More specifically, letting $i_{in1\_sub}(x, y)$ and $i_{in2\_sub}(x, y)$ be first and second super resolution processing images that are segmented into regions, $NM_{1\_sub}(x, y)$ and $NM_{2\_sub}(x, y)$ be noise maps, and $i_{out}(x, y)$ be an output image, the processing can be expressed as $$i_{out}(x, y) = \begin{cases} i_{in1\_sub}(x, y) & \left(\sum NM_{1\_sub}(x, y) \leq \sum NM_{2\_sub}(x, y)\right) \\ i_{in2\_sub}(x, y) & \left(\sum NM_{1\_sub}(x, y) > \sum NM_{2\_sub}(x, y)\right) \end{cases} \quad (45)$$

According to the above-described embodiments, it is possible to perform super resolution processing capable of improving sharpness for an entire image without visual perception of noise degradation. Note that the embodiments described above can be combined.

The above-described embodiments are merely examples of detailed implementation of the present invention, and are not intended to limit the technical scope of the present invention. That is, the present invention can be implemented in various forms without departing from its technical scope or main features.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-226038, filed 30 Oct. 2013, and Japanese Patent Application No. 2013-264501, filed 20 Dec. 2013 which are hereby incorporated by reference herein in their entirety.

What is claimed is:

1. An image processing apparatus comprising:
   one or more processors; and
   at least one memory coupled to the one or more processors, the at least one memory having instructions stored thereon which, when executed by the one or more processors cause the image processing apparatus to:
   acquire an evaluation value concerning noise for each region of an image frame corresponding to image data,
   control image processing of each region of the image frame corresponding to the image data in accordance with the evaluation value,
   specify a characteristic of noise of the image data based on a condition concerning exposure when capturing the image data, and
   control the image processing of the image data based on the acquired evaluation value,
   wherein the acquiring comprises:
      acquiring the evaluation value representing a noise perception amount based on the image data, the specified characteristic of the noise, and information representing a visual sensitivity to light,
      generating a noise image as an image formed by superimposing the noise having the specified characteristic on the image data,
      transforming each of the image data and the noise image into a function of a spatial frequency,
      multiplying each of the transformed image data transformed into the function of the spatial frequency and the transformed noise image transformed into the function of the spatial frequency by a spatial visual characteristic representing a relationship between a contrast sensitivity and the spatial frequency,
      dividing each of the multiplied image data multiplied by the spatial visual characteristic and the multiplied noise image multiplied by the spatial visual characteristic into spatial frequency bands,
      calculating a partial noise perception amount as the noise perception amount for each spatial frequency band based on the divided image data divided into the spatial frequency bands and the divided noise image divided into the spatial frequency bands, and
      calculating the noise perception amount by compositing the calculated partial noise perception amounts.

2. The apparatus according to claim 1, wherein the instructions, when executed by the one or more processors further cause the image processing apparatus to divide each of the multiplied image data and the multiplied noise image, each of which is multiplied by the spatial visual characteristic, into the spatial frequency bands using one of a band division filter whose characteristic of the spatial frequency is defined by combining the characteristic in a circumferential direction and the characteristic in a radial direction of a spatial frequency domain and a band division filter whose characteristic of the spatial frequency is defined by combining the characteristic in a longitudinal direction and the characteristic in a lateral direction of the spatial frequency domain.

3. An image processing method comprising:
acquiring an evaluation value concerning noise for each region of an image frame corresponding to image data;
controlling image processing of each region of the image frame corresponding to the image data in accordance with the evaluation value; and
specifying a characteristic of noise of the image data based on a condition concerning exposure when capturing the image data,
wherein the evaluation value representing a noise perception amount based on the image data, the characteristic of the specified noise, and information representing a visual sensitivity to light are acquired in the acquiring,
wherein the image processing of the image data based on the acquired evaluation value is controlled in the controlling, and
wherein the acquiring comprises:
generating a noise image as an image formed by superimposing the noise having the specified characteristic on the image data;
transforming each of the image data and the noise image into a function of a spatial frequency;
multiplying each of the transformed image data transformed into the function of the spatial frequency and the transformed noise image transformed into the function of the spatial frequency by a spatial visual characteristic representing a relationship between a contrast sensitivity and the spatial frequency;
dividing each of the multiplied image data multiplied by the spatial visual characteristic and the multiplied noise image multiplied by the spatial visual characteristic into spatial frequency bands;
calculating a partial noise perception amount as the noise perception amount for each spatial frequency band based on the divided image data divided into the spatial frequency bands and the divided noise image divided into the spatial frequency bands; and
calculating the noise perception amount by compositing the calculated partial noise perception amounts.

4. A non-transitory computer-readable storage medium storing a computer program for controlling a computer to execute an image processing method, the method comprising:
acquiring an evaluation value concerning noise for each region of an image frame corresponding to image data;
controlling image processing of each region of the image frame corresponding to the image data in accordance with the evaluation value; and
specifying a characteristic of noise of the image data based on a condition concerning exposure when capturing the image data,
wherein, in the acquiring, the evaluation value representing a noise perception amount based on the image data, the characteristic of the specified noise, and information representing a visual sensitivity to light are acquired,
wherein, in the controlling, the image processing of the image data based on the acquired evaluation value is controlled, and
wherein the acquiring comprises:
generating a noise image as an image formed by superimposing the noise having the specified characteristic on the image data;
transforming each of the image data and the noise image into a function of a spatial frequency;
multiplying each of the transformed image data transformed into the function of the spatial frequency and the transformed noise image transformed into the function of the spatial frequency by a spatial visual characteristic representing a relationship between a contrast sensitivity and the spatial frequency;
dividing each of the multiplied image data multiplied by the spatial visual characteristic and the multiplied noise image multiplied by the spatial visual characteristic into spatial frequency bands;
calculating a partial noise perception amount as the noise perception amount for each spatial frequency band based on the divided image data divided into the spatial frequency bands and the divided noise image divided into the spatial frequency bands; and
calculating the noise perception amount by compositing the calculated partial noise perception amounts.

* * * * *